(12) United States Patent
Feineman

(10) Patent No.: US 11,874,386 B2
(45) Date of Patent: Jan. 16, 2024

(54) RF POLARIMETERS WITH OPTICAL DELAY LINES

(71) Applicant: Cobham Advanced Electronic Solutions, Inc., Lansdale, PA (US)

(72) Inventor: Arnold N. Feineman, Doylestown, PA (US)

(73) Assignee: Cobham Advanced Electronic Solutions, Inc., Lansdale, PA (US)

( * ) Notice: Subject to any disclaimer, the term of this patent is extended or adjusted under 35 U.S.C. 154(b) by 168 days.

(21) Appl. No.: 17/365,984

(22) Filed: Jul. 1, 2021

(65) Prior Publication Data

US 2021/0333350 A1 Oct. 28, 2021

Related U.S. Application Data

(63) Continuation-in-part of application No. 16/941,512, filed on Jul. 28, 2020, now Pat. No. 11,385,314,
(Continued)

(51) Int. Cl.
*G01S 5/04* (2006.01)
*G01S 3/48* (2006.01)
(Continued)

(52) U.S. Cl.
CPC ........... *G01S 3/48* (2013.01); *G01S 3/043* (2013.01); *G01S 3/74* (2013.01); *G01S 3/46* (2013.01); *G01S 3/50* (2013.01)

(58) Field of Classification Search
CPC ..... G01S 3/48; G01S 3/74; G01S 3/72; G01S 3/46; G01S 3/50; G01S 3/043
(Continued)

(56) References Cited

U.S. PATENT DOCUMENTS

| 4,736,463 A | 4/1988 | Chavez |
|---|---|---|
| 5,457,466 A | 10/1995 | Rose |

(Continued)

FOREIGN PATENT DOCUMENTS

EP 0553945 B1 4/1998

OTHER PUBLICATIONS

Feineman, Office Action, U.S. Appl. No. 16/941,512, dated Dec. 9, 2021, 9 pgs.
(Continued)

*Primary Examiner* — Chuong P Nguyen
(74) *Attorney, Agent, or Firm* — Morgan, Lewis & Bockius LLP

(57) ABSTRACT

Systems and methods are provided for determining a polarization state of an input RF signal. Two distinct RF antennas receive the input RF signal and output a first antenna signal and a second antenna signal. Polarizsations of the first and second antenna signals are orthogonal to one another. The first antenna signal is converted to a first optical signal, and the first optical signal is passed through a first optical signal to introduce a first delay. The delayed first optical signal is converted to a first RF signal. An amplitude ratio and a phase difference are determined between the first RF signal and a second RF signal that is associated with the second antenna and optionally includes a second delay. A polarization angle or polarization type of the input RF signal is determined based on the amplitude ratio and phase difference of the first and second RF signals.

20 Claims, 24 Drawing Sheets

Related U.S. Application Data which is a continuation of application No. 15/422,336, filed on Feb. 1, 2017, now Pat. No. 10,725,142.

(51) Int. Cl.

| | | |
|---|---|---|
| *G01S 3/74* | (2006.01) | |
| *G01S 3/04* | (2006.01) | |
| *G01S 3/46* | (2006.01) | |
| *G01S 3/50* | (2006.01) | |

(58) Field of Classification Search
USPC .......................................... 342/442, 445, 417
See application file for complete search history.

(56) References Cited

U.S. PATENT DOCUMENTS

| | | | |
|---|---|---|---|
| 5,936,575 | A | 8/1999 | Azzarelli et al. |
| 6,807,321 | B2 * | 10/2004 | Madsen ................ G02B 6/278 |
| | | | 385/11 |
| 7,412,175 | B2 * | 8/2008 | Chuss ...................... G01J 4/04 |
| | | | 398/1 |
| 7,555,217 | B2 | 6/2009 | Hillis et al. |
| 7,692,586 | B2 | 4/2010 | Straatveit |
| 8,249,618 | B2 | 8/2012 | Fireaizen |
| 9,590,740 | B1 | 3/2017 | Pace et al. |
| 9,966,661 | B2 | 5/2018 | Xue et al. |
| 10,082,382 | B2 | 9/2018 | Schmitt et al. |
| 10,313,012 | B2 | 6/2019 | Murakowski et al. |
| 10,564,249 | B2 | 2/2020 | Dierafi et al. |
| 10,693,561 | B2 * | 6/2020 | Lim ........................ H04J 14/06 |
| 10,698,097 | B1 * | 6/2020 | Esman ................ G01S 13/4409 |
| 10,969,458 | B1 * | 4/2021 | Clymer .................... G01S 3/06 |
| 2005/0195103 | A1 | 9/2005 | Davis et al. |
| 2006/0210279 | A1 | 9/2006 | Hillis et al. |
| 2009/0111483 | A1 | 4/2009 | Flereizen |
| 2009/0303573 | A1 | 12/2009 | Hillis et al. |
| 2012/0140236 | A1 | 6/2012 | Babbitt et al. |
| 2019/0212408 | A1 | 7/2019 | Lam |
| 2021/0333350 | A1 | 10/2021 | Feineman |

OTHER PUBLICATIONS

Feineman, Notice of Allowance, U.S. Appl. No. 16/941,512, dated Mar. 22, 2022, 10 pgs.

Godby, George, "Using GNU Radio for Signal Phase Measurements," ECE 480 Senior Design, Mar. 27, 2014, 12 pgs.

Harter, Nathan M., "Development of a Single-Channel Direction Finding Algorithm," Thesis, Polytechnic Institue and State University, Apr. 13, 2007, 118 pgs.

Lipsky, "Microwave Passive Direction Finding," Copyright © 1987 by John Wiley & Sons, Inc., 10 pgs.

Miller, Paul, "Study of Feasability for Phase Difference Extraction Using Software Defined Radio in Location Analysis," Master's Theses, Paper 176, Western Michigan University, Jun. 2013, 95 pgs.

Pace, et al., "High-Resolution Phase Sampled Interferometry Using Symmetrical Number Systems," IEEE Transactions on Antennas and Propagation, vol. 49, No. 10, Oct. 2001, 14 pgs.

Peavy, et al., "The Single Channel Interferometer Using a Pseudo-Doppler Direction Finding System," Copyright 1997 IEEE, 4 pgs.

Tsui, Digital Techniques for Wideband Receivers, © 1995 Artech House, Inc., 17 pgs.

Balanis, C.A. "Antenna Theory Analysis and Design," Polarization Measurements, Second Edition 1997, pp. 879 and 880.

Kummer, W.H. and Gillespie, E.S. "Antenna Measurements 1978," Proceedings of the IEEE, vol. 66, No. 4, Apr. 1978. Section IV.c the Phase Amplitude Methods of Polarization Measurement, pp. 500 and 501.

\* cited by examiner

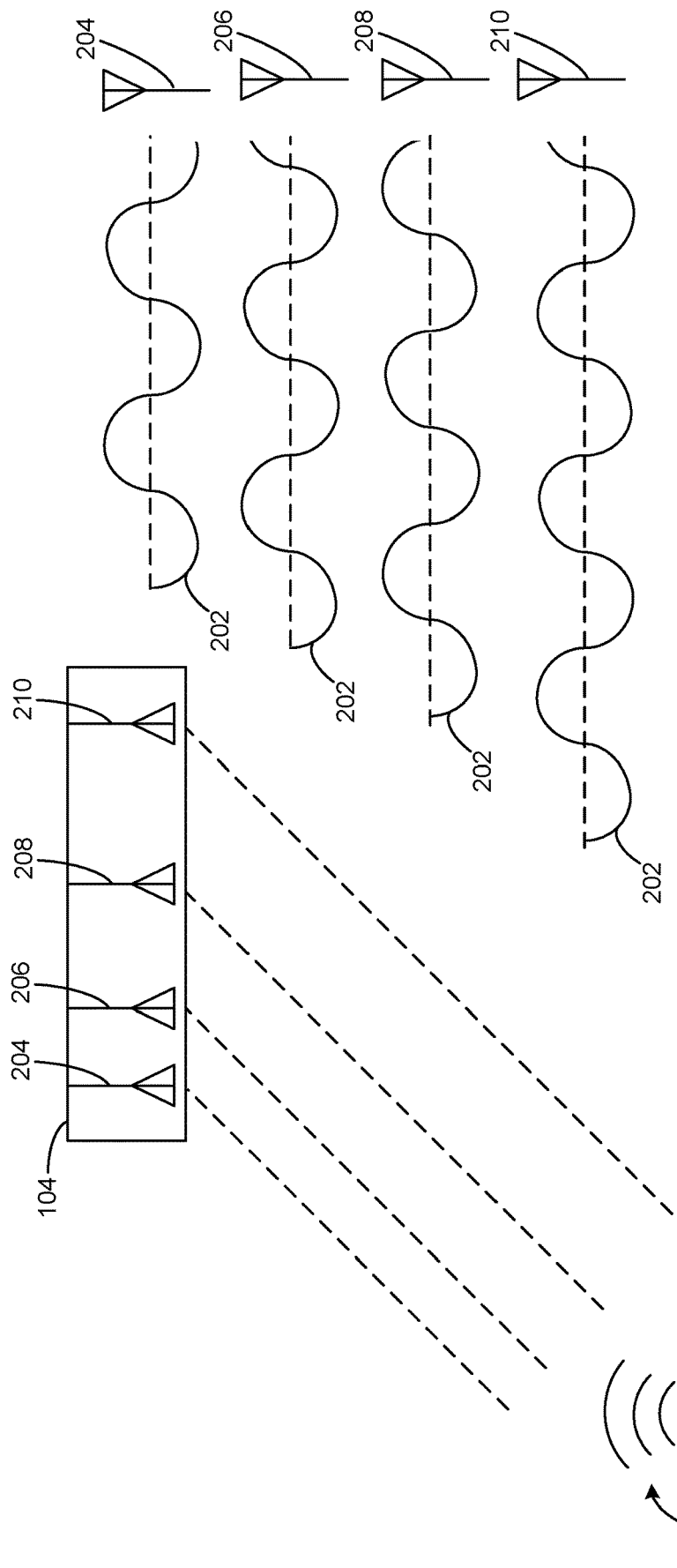

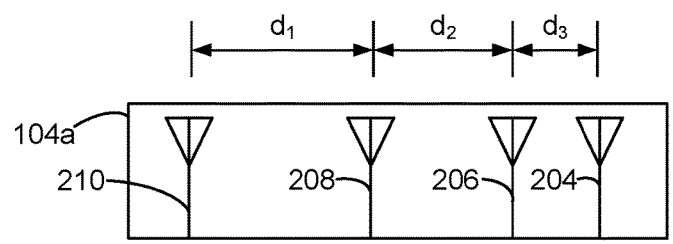
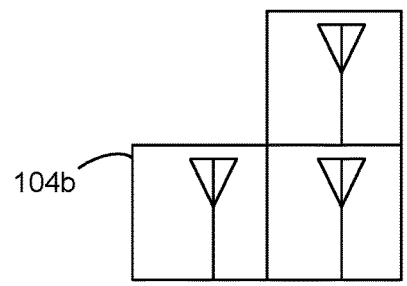
Figure 4A
Figure 4B
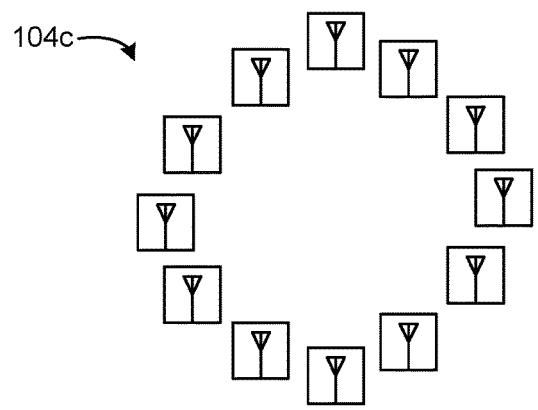
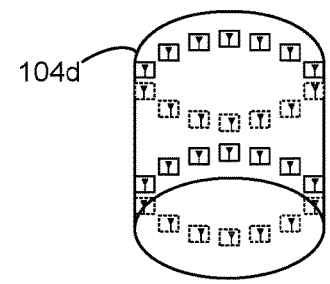
Figure 4C
Figure 4D
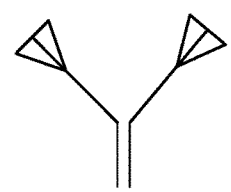
Figure 4E

1000

1002
Receive, by a plurality of radio frequency (RF) antennas including a first antenna and a second antenna, an RF signal

1004
Output, by the plurality of RF antennas, a plurality of antenna signals including a first antenna signal and a second antenna signal

1006
Receive, by a first converter, the plurality of antenna signals including the first antenna signal and the second antenna signal

1008
Output, by the first converter, a plurality of optical signals, including a first optical signal converted from the first antenna signal and a second optical signal converted from the second antenna signal

1010
Receive, by a second converter, the plurality of optical signals, wherein:
the first optical signal of the plurality of optical signals is received by the second converter from the first converter via a first optical channel with a first length, wherein the first optical channel introduces a first delay that is proportional to the length of the first optical channel, and
the second optical signal of the plurality of optical signals is received via a second optical channel with a second length that is longer than the first length, wherein the second optical channel introduces a second delay that is proportional to the length of the second optical channel

1012
At least one of the first optical channel or the second optical channel includes optical fiber (A)

1048
Electronically coupling the first switch to the second RF signal output of the second converter to receive the second RF signal occurs a predetermined amount of time after electronically coupling the first switch to the first RF signal output of the second converter to receive the first RF signal

1050
Receive, by a second switch that is communicatively coupled to the direction finding subsystem, the first RF signal

1052
Output, by the second switch, the first RF signal (C)

1054
After the predetermined amount of time, receive, by the second switch, the second RF signal

1056
Output, by the second switch, the second RF signal (D)

1058
Apply, by a delay device, a delay to the first RF signal

1060
The delay device includes optical fiber

Ⓓ

1062
Apply, by a digital delay device, a delay to a reference signal generated by a reference signal generator; and wherein the phase difference between the first RF signal and the second RF signal is determined using: a phase difference between the first RF signal and the reference signal, and a phase difference between the second RF signal and the delayed reference signal

Ⓓ

1064
Store, by a memory device, a digitized representation of the first RF signal output of the second switch; and store, by the memory device, a digitized representation of the second RF signal output of the second switch, wherein a digital delay is applied to the second RF signal stored by the memory device

1102
Receive, by a plurality of radio frequency (RF) antennas including a first antenna and a second antenna, an RF signal

1104
Output, by the plurality of RF antennas, a plurality of antenna signals including a first antenna signal and a second antenna signal

1106
Receive, by a first converter that is electrically coupled to the plurality of RF antennas, the second antenna signal

1108
Output, by the first converter, an optical signal converted from the second antenna signal

1110
Receive, by a second converter, the optical signal, wherein the optical signal is received via an optical channel that introduces a delay that is proportional to the length of the optical channel

1112
Output, by an RF signal output of the second converter, an optically delayed RF signal that corresponds to the second antenna

1114
Electronically couple a first switch to a first output of the first antenna to receive the first antenna signal

Receive, by a plurality of radio frequency (RF) antennas including a first RF antenna having a first polarization and a second RF antenna having a second polarization, an input RF signal having an input polarization, wherein the first and second polarizations are orthogonal to one another 1502

Output by the first RF antenna a first antenna signal 1504

Output by the second RF antenna a second antenna signal 1506

Convert the first antenna signal to a first optical signal 1508

Pass the first optical signal through a first optical channel to introduce a first delay 1510

Convert the delayed first optical signal to a first RF signal 1512

Determine an amplitude ratio and a phase difference between the first RF signal and a second RF signal associated with the second antenna signal 1514

Determine a polarization angle of the input RF signal received by the plurality of RF antennas based on the amplitude ratio and the phase difference 1516

Figure 15

RF POLARIMETERS WITH OPTICAL DELAY LINES

RELATED APPLICATIONS

This application claims priority to and is a continuation-in-part of U.S. Utility patent application Ser. No. 16/941,512, filed Jul. 28, 2020, titled "Single Channel Interferometer with Optical Delay Lines," which is a continuation of U.S. Utility patent application Ser. No. 15/422,336, filed Feb. 1, 2017, titled "Single Channel Interferometer with Optical Delay Lines," now U.S. Pat. No. 10,725,142, each of which is herein incorporated by reference in its entirety.

TECHNICAL FIELD

The disclosed embodiments relate generally to a radio frequency (RF) interferometer for determining direction of arrival and/or an RF polarimeter for determining a polarization of a received signal, and in particular, to techniques for applying a delay to the output of at least one interferometer antenna or at least one orthogonal polarization antenna using an optical delay line.

BACKGROUND

Multi-antenna interferometers determine a direction of arrival of a signal using a difference between a phase of the signal as received by a reference antenna and a phase of the signal as received by at least one other antenna. Many interferometers perform phase detection using phase data received via parallel channels. Transmitting phase data via a single channel rather than parallel channels is beneficial in various situations, such as when the interferometer is installed in an existing system (e.g., retrofitted in an aircraft). Transmitting interferometer data via a single channel potentially reduces the size, weight, power, and cost requirements of interferometer electronics and direction finding systems.

SUMMARY

There is a need for systems and methods for determining a direction of arrival of a radio frequency (RF) signal using a single, time multiplexed receiver channel that uses true time delays to normalize and synchronize the measurements of multiple antennas to the same instant in time. Such systems and methods are capable of determining direction of arrival of RF signals by an interferometer pulsed or continuous RF waveforms while enabling data transfer from the measurement subsystem of the interferometer to the direction finding subsystem of the interferometer via a single channel.

An interferometer using a receiver in each channel requires that the receivers be matched or calibrated closely in phase to one another. The multiple receiver channels allow all antenna phase differences to be calculated at the same instant in time, so the relative phases are not impacted by platform motion between measurements. In the single channel interferometer, the antennas are sampled sequentially which could introduce errors if not compensated by adding time delays through progressively longer length transmission lines. Receiver phase matching is inherent in the single channel interferometer, as there is only one receiver channel. Interferometer receivers typically use a relatively narrow bandwidth to ensure that only the signal of interest is being measured; as a result, relatively long time delays are needed to allow the sampled signals to reach their steady state value. Conventional transmission line techniques for achieving long delays are large, heavy, have high RF losses above 3 GHz, and are subject to phase and delay changes due to temperature changes. The novel application of optical delay lines enables the practical implementation of a single channel interferometer at frequencies above 3 GHz and can also be used to improve interferometers operating at frequencies below 3 GHz.

Measuring polarization parameters of a received signal has many applications in radar, environmental sensing, signals intelligence, and electronic warfare. Examples of polarization parameters include, but are not limited to, polarization axes, polarization angle, and direction of polarization rotation. Such polarization parameters can be accurately measured based on amplitudes (e.g., V and H) and phases that are simultaneously measured from two polarized components of the received signal. For example, in-phase and quadrature phase RF signals may be measured simultaneously in two channels. However, such simultaneous measurement only provides a high accuracy in determination of the polarization parameters of the received signal in a laboratory environment, and a size, weight, and power of equipment involved in the measurement does not allow application of such measurement in many field environments.

A single channel polarimeter is coupled to one or more optical delay lines, and can be used standalone or as an adjunct to a single channel interferometer coupled to the optical delay lines. In some embodiments, a single channel interferometer can be modified to measure both an angle of arrival and polarization of an input RF signal. This provides a complementary benefit. Knowledge of received signal polarization improves the interferometer's estimate of the signal angle of arrival, and knowledge of the signal angle of arrival improves an estimate of signal polarization. By these means, two way energy transfer can be optimized, when combined with an antenna configured to transmit RF signals (e.g., a transmit antenna) that is also steerable in angle and polarization. More details on the single channel interferometer with optical delay lines are discussed in U.S. Pat. No. 10,745,142, which is herein incorporated by reference in its entirety.

In another aspect, a method is implemented for determining a polarization state of a radio frequency (RF) signal. The method includes receiving, by a plurality of radio frequency (RF) antennas including a first RF antenna having a first polarization and a second RF antenna having a second polarization. An input RF signal has an input polarization, and the first and second polarizations are orthogonal to one another. The method further includes outputting by the first RF antenna a first antenna signal, outputting by the second RF antenna a second antenna signal, converting the first antenna signal to a first optical signal, passing the first optical signal through a first optical channel to introduce a first delay, and converting the delayed first optical signal to a first RF signal. The method further includes determining an amplitude ratio and a phase difference between the first RF signal and a second RF signal associated with the second antenna signal. The method further includes determining a polarization angle of the input RF signal received by the plurality of RF antennas based on the amplitude ratio and the phase difference.

In some embodiments, the method further includes determining a polarization type of the input RF signal based on the amplitude ratio and phase difference between the first and second RF signals. In some embodiments, the method further includes prior to determining an amplitude ratio and a phase difference: converting the second antenna signal to a second optical signal, passing the second optical signal through a second optical channel to introduce a second delay, and converting the delayed second optical signal to the second RF signal that is used to determine the amplitude ratio and phase difference. In some embodiments, the method further includes controlling an optical switch to select and output the delayed first optical signal that is further converted to the first RF signal, and after outputting the first optical signal, controlling the optical switch to select and output the delayed second optical signal that is further converted to the second RF signal.

In yet another aspect, an electronic system includes a plurality of RF antennas, a first converter, a first optical channel, a second converter, and a polarization analysis unit. The plurality of RF antennas are configured for receiving an input RF signal having an input polarization. The plurality of RF antennas includes a first RF antenna having a first polarization and configured for outputting a first antenna signal and a second RF antenna having a second polarization and configured for outputting a second antenna signal. The second polarization is orthogonal to the first polarization. The first converter is configured for converting the first antenna signal to a first optical signal. The first optical channel is configured for passing the first optical signal and introducing a first delay. The second converter is configured for converting the first optical signal to a first RF signal. The polarization analysis unit is configured for determining an amplitude ratio and a phase difference between the first RF signal and a second RF signal associated with the second antenna signal, and determining a polarization angle of the input RF signal received by the plurality of RF antennas based on the amplitude ratio and the phase difference.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 3A-3B illustrate use of an array of antennas of an interferometer to determine direction of arrival of a signal transmitted by a signal transmitter when the signal transmitter is at a second position relative to an interferometer, in accordance with some embodiments.

FIGS. 4A-4E illustrate various configurations of antennas in an antenna array of an interferometer, in accordance with some embodiments.

FIGS. 10A-10F are flow diagrams illustrating a method for determining a direction of arrival of an RF signal, in accordance with some embodiments.

FIGS. 11A-11B are flow diagrams illustrating a method for determining a direction of arrival of an RF signal, in accordance with some embodiments.

FIG. 15 is a flowchart of a method implemented by an electronic system for determining a polarization state of an input RF signal, in accordance with some embodiments.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

Figure 1:
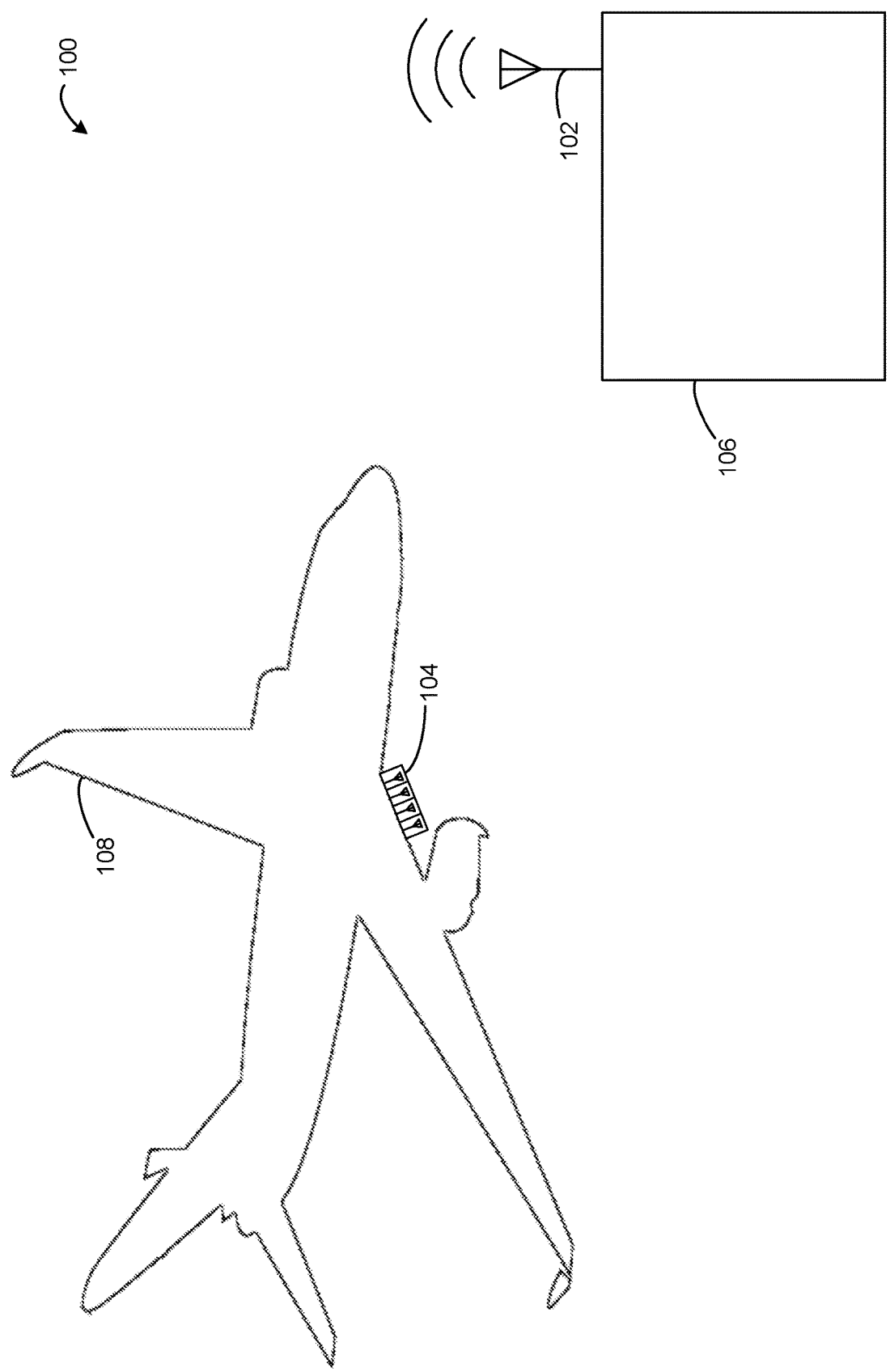
FIG. 1 illustrates an aircraft operation environment for an interferometer, in accordance with some embodiments.

FIG. 1 illustrates an aircraft operation environment 100, in accordance with some embodiments. Aircraft operation environment 100 includes a signal transmitter 102 and an interferometer 104. In the illustrative example shown in FIG. 1, signal transmitter 102 is a static, ground based radar (e.g., mounted to a building 106) and interferometer 104 is mounted to an aircraft 108. Aircraft 108 is, e.g., an airplane or other aerial vehicle. Although interferometer 104 is shown as a linear array of multiple antennas in the illustrative example of FIG. 1, different arrangements of antennas can be used for interferometer 104, e.g., as described with regard to FIGS. 4A-4D. Typically, an axis along which at least some of the antennas in interferometer 104 are arranged (e.g., an axis along which antennas in a linear array are arranged) is perpendicular to the direction of travel of the aircraft. For example, the antenna array is located along a leading edge of an aircraft wing, as shown in FIG. 1, or in the nose of the aircraft.

It will be recognized that installation of interferometer 104 in an aircraft is an illustrative example of implementation of the interferometer 104. In some embodiments, interferometer 104 as described herein is implemented in alternative systems, such as any manned or unmanned aircraft, spacecraft, sea craft, ground vehicle, or fixed site installation. It will be recognized that benefits to size, weight, power, and cost of interferometer 104 over existing interferometers is applicable in fixed wing aircraft as well as in alternative systems such as those discussed above.

Figure 2B:
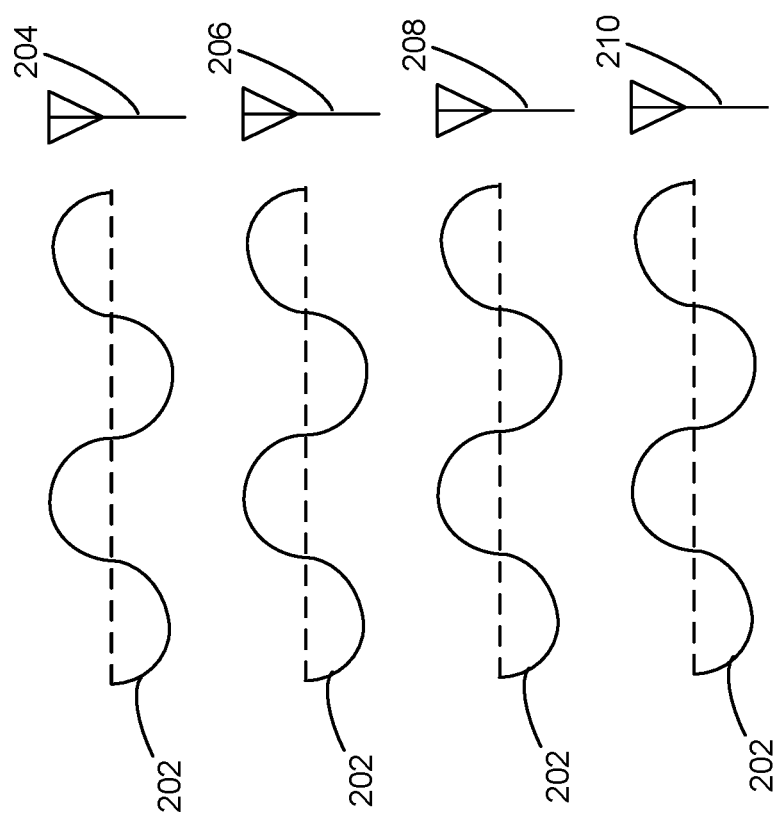
FIGS. 2A-2B illustrate use of an array of antennas of an interferometer to determine direction of arrival of a signal transmitted by a signal transmitter when the signal transmitter is at a first position relative to an interferometer, in accordance with some embodiments.
Figure 2A:
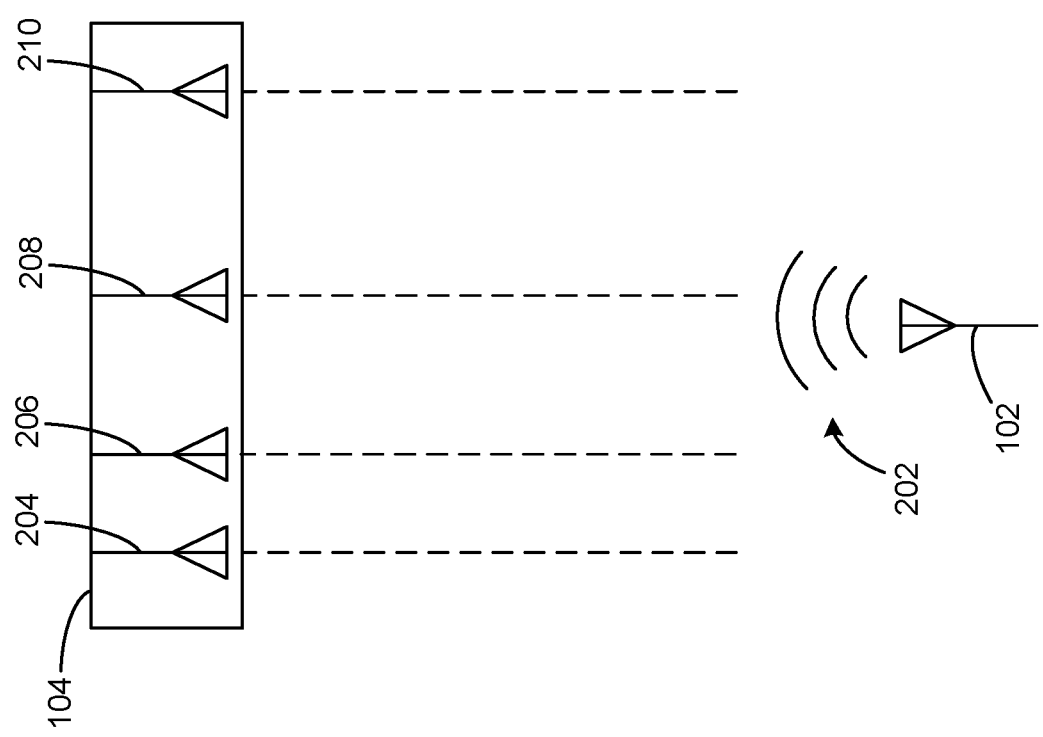

FIGS. 2A-2B illustrate use of an array of antennas of interferometer 104 to determine direction of arrival of a signal transmitted by signal transmitter 102 when signal transmitter 102 is at a first angular position relative to interferometer 104, in accordance with some embodiments.

In FIG. 2A, signal 202 transmitted by signal transmitter 102 travels the same distance to each of antennas 204, 206, 208 and 210. FIG. 2B illustrates signal 202 arriving at antennas 204-210. While signal 202 is shown as a sine wave (in FIG. 2B) for simplicity of illustration, it will be recognized that different signal types may be used. In FIG. 2B, signal 202 as received by antenna 204 is in phase with signal 202 as received by antennas 206, 208, and 210. An angle of arrival of the signal is determined based on the phase of signal 202 as received at antennas 204-210. As a result of the lack of a difference in phase between signal 202 as received by antenna 204 and signal 202 as received by antennas 206, 208, and 210, an angle of arrival determined from the output of antennas 204, 206, 208, and 210 is zero degrees.

FIGS. 3A-3B illustrate use of an array of antennas of interferometer 104 to determine direction of arrival of a signal transmitted by signal transmitter 102 when signal transmitter 102 is at a second angular position relative to interferometer 104, in accordance with some embodiments.

In FIG. 3A, signal 202 travels different distances to reach antennas 204, 206, 208, and 210. As a result, as shown in FIG. 3B, signal 202 as received by antenna 204 is out of phase with signal 202 as received by antennas 206, 208, and 210. Based on the phase differences between signal 202 as received at antennas 206-210, an angle of arrival of signal 202 is determined. In the illustrative example of FIGS. 3A-3B, the angle of arrival of signal 202 is 45 degrees.

FIGS. 4A-4D illustrate various configurations of antennas in an antenna array of interferometer 104, in accordance with some embodiments. Typically, antennas in an antenna array of interferometer 104 are phase matched and/or phase calibrated.

FIG. 4A illustrates an interferometer 104a that includes a linear array of antennas 204, 206, 208, and 210. Typically, antennas in a linear array are arranged such that the distances between adjacent antennas are integer multiples of $\lambda/2$, where $\lambda$, is the wavelength that corresponds to the highest frequency measured by the system. For example, in some embodiments, signal 202 is an RF signal with a frequency in the range 1 GHz to 300 GHz. In some embodiments the RF frequency range is within the UHF (300-3000 MHz) range or lower. In FIG. 4A, the distance $d_3$ between antennas 204 and 206 is $\lambda/2$, the distance $d_2$ between antennas 206 and 208 is k, and the distance $d_1$ between antennas 208 and 210 is $2\lambda$. Linear antenna arrays are usable to determine direction (angle) of approach of a signal.

As the wavelength $\lambda$, of signals detected by interferometer 104 decreases, and the wavelength becomes small relative to the rate of movement of the object (e.g., aircraft) to which interferometer 104 is attached, the movement of the object is more likely to introduce errors in phase difference measurements and direction of arrival calculations performed by the interferometer 104. For example, error increases at shorter wavelengths because the aircraft position change between samples corresponds to a larger number of wavelengths, resulting in a larger phase change between samples. Thus, precision time synchronization of the multiplexer switch, delay lines, and demultiplexer is increasingly important as the frequency of the detected signals increases.

FIG. 4B illustrates an interferometer 104b that includes a planar array of antennas. Planar arrays allow azimuth and elevation angle of a received signal to be determined. Using known information about the location of the platform to which the interferometer 104 is mounted, a planar array of antennas can be used to determine the position of a signal transmitter 102.

FIG. 4C illustrates an interferometer 104c that includes a circular array of antennas. A circular array of antennas provides a 360° field of view.

FIG. 4D illustrates an interferometer 104d that includes a cylindrical array of antennas. A cylindrical array of antennas provides an omnidirectional-azimuth field of view and a defined elevation field of view in the orientation shown.

FIG. 4E illustrates an interferometer using two antennas whose boresight directions are offset in angle from one another. The interferometer phase measurement may result in an ambiguous direction of arrival (multiple directions can result in the same phase difference). The ambiguity can be resolved by computing a coarse direction of arrival from the difference in amplitude of the signals between the two antennas.

In some embodiments, interferometer 104 is used to finding a bearing angle (e.g., angle of arrival), direction of arrival, and/or location of an unknown emitter. In some embodiments, interferometer 104 is used to determine a bearing angle, direction of arrival and/or location of a known emitter. For example, by processing bearing angles of signals received from known emitter locations, the interferometer host platform can determine its own location if a GPS signal is not available.

Figure 5:
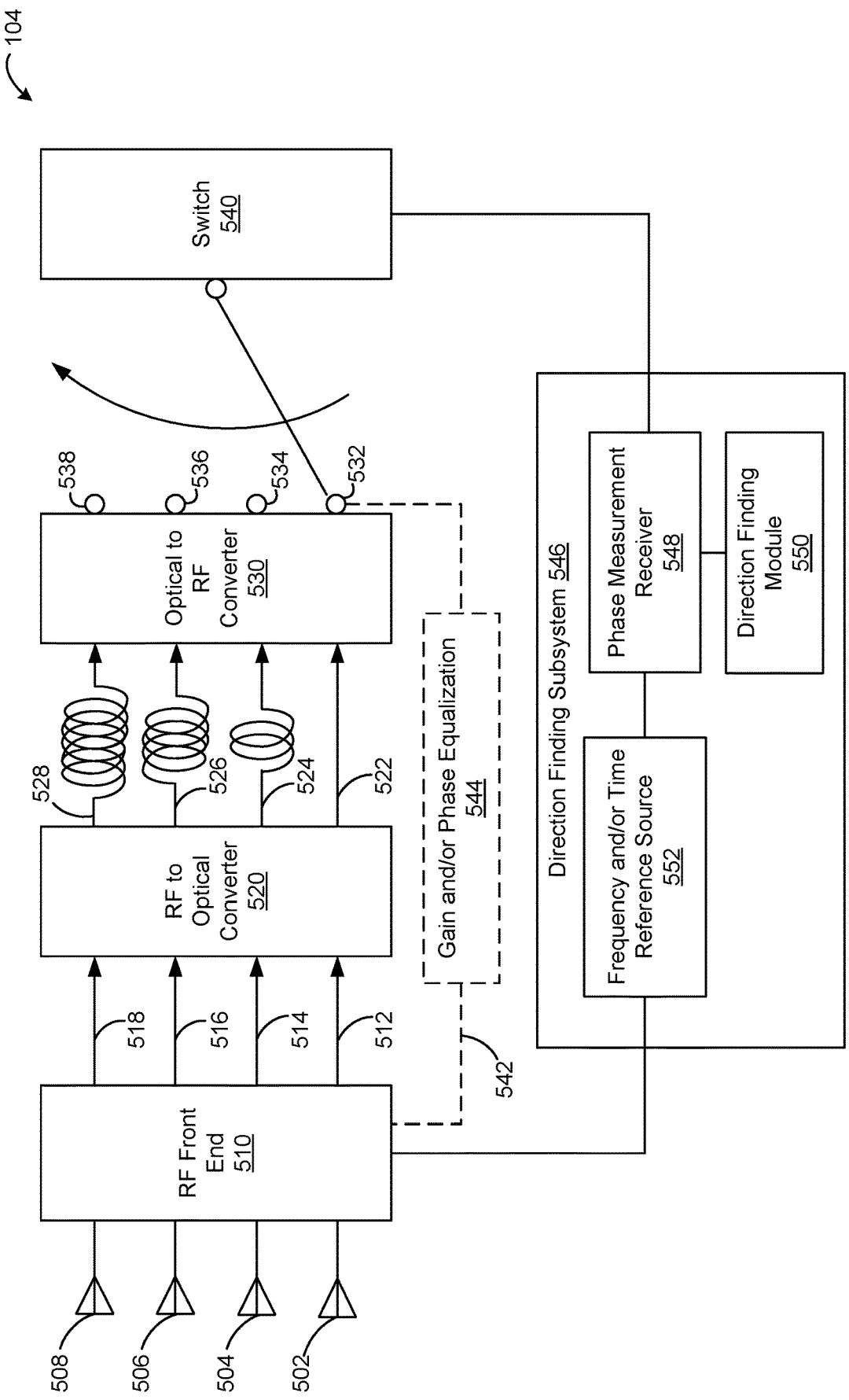
FIG. 5 illustrates a single channel interferometer, in accordance with some embodiments.

FIG. 5 illustrates an interferometer 104, in accordance with some embodiments. Interferometer 104 detects incoming signals using two or more antennas. In the illustrative example of FIG. 5, interferometer 104 includes a measurement subsystem with antennas 502, 504, 506, and 508, RF front end 510, optical to RF converter 530, switch 540, (optionally) gain and/or phase equalization component 544, and connecting channels and/or delays. In some embodiments, antennas 502, 504, 506, and 508, correspond to antennas 204, 206, 208, 210, respectively, of a linear array of antennas as described with regard to FIGS. 1-4A. In some embodiments, antennas 502, 504, 506, and 508 are antennas of a planar array (e.g., as described with regard to FIG. 4B), a circular array (e.g., as described with regard to FIG. 4C), a cylindrical array (e.g., as described with regard to FIG. 4D), or any other configuration of antenna elements in an array.

In some embodiments, single channel interferometer 104 includes radio frequency (RF) front end 510 that includes components for processing incoming signals received by antennas 502-508, such as one or more filters, limiters, calibration circuits (e.g., circuits that store phase calibration offsets and/or delay calibration offsets for each antenna output), low noise amplifiers (e.g., applied to each antenna output), and/or downconverters (e.g., for converting antenna output signals to lower frequencies). Components of RF front end 510 may apply the same processing to the outputs of antennas 502-508 and/or different processing to the outputs of antennas 502-508. In some embodiments, low noise amplifiers of RF front end 510 compensate for the losses introduced by optical channels 522-528 and/or other components of single channel interferometer 104.

An RF to optical converter 520 receives RF signals from antennas 502-508 (e.g., as processed by RF front end 510) via channels 512, 514, 516, and 518. RF to optical converter 520 converts analog RF signals into optical signals for transmission via optical channels 522, 524, 526, and 528.

In some embodiments, optical channels 522-528 are optical fiber channels (e.g., optical fiber channels including spooled optical fiber of varying lengths to apply varying delays along the lengths of the channels). The novel use of optical fiber allows delays of 100s of nanoseconds or more to be achieved in a very low physical volume if necessitated by the bandwidth of the phase measuring receiver channel. The lengths of optical channels 522-528 are indicated by the increasing number of loops in respective coils indicated in optical channels 522-528. For example, the length of optical channel 528 is greater than the length of optical channel 526, the length of optical channel 526 is greater than the length of optical channel 524, and the length of optical channel 524 is greater than the length of optical channel 522. In some embodiments, optical channels 522, 524, 526, and 528 introduce first, second, third, and fourth delays, respectively, that are proportional to the respective lengths of the channels.

In some embodiments, optical channels are optical waveguides or another physical structure that guides optical spectrum waves.

An optical to RF converter 530 receives optical signals via optical channels 522-528 and converts the optical signals to RF signals. RF signals corresponding to the optical signals carried by optical channels 522, 524, 526, and 528 are output at nodes 532, 534, 536, and 538, respectively, of optical to RF converter 530.

Figure 10B:
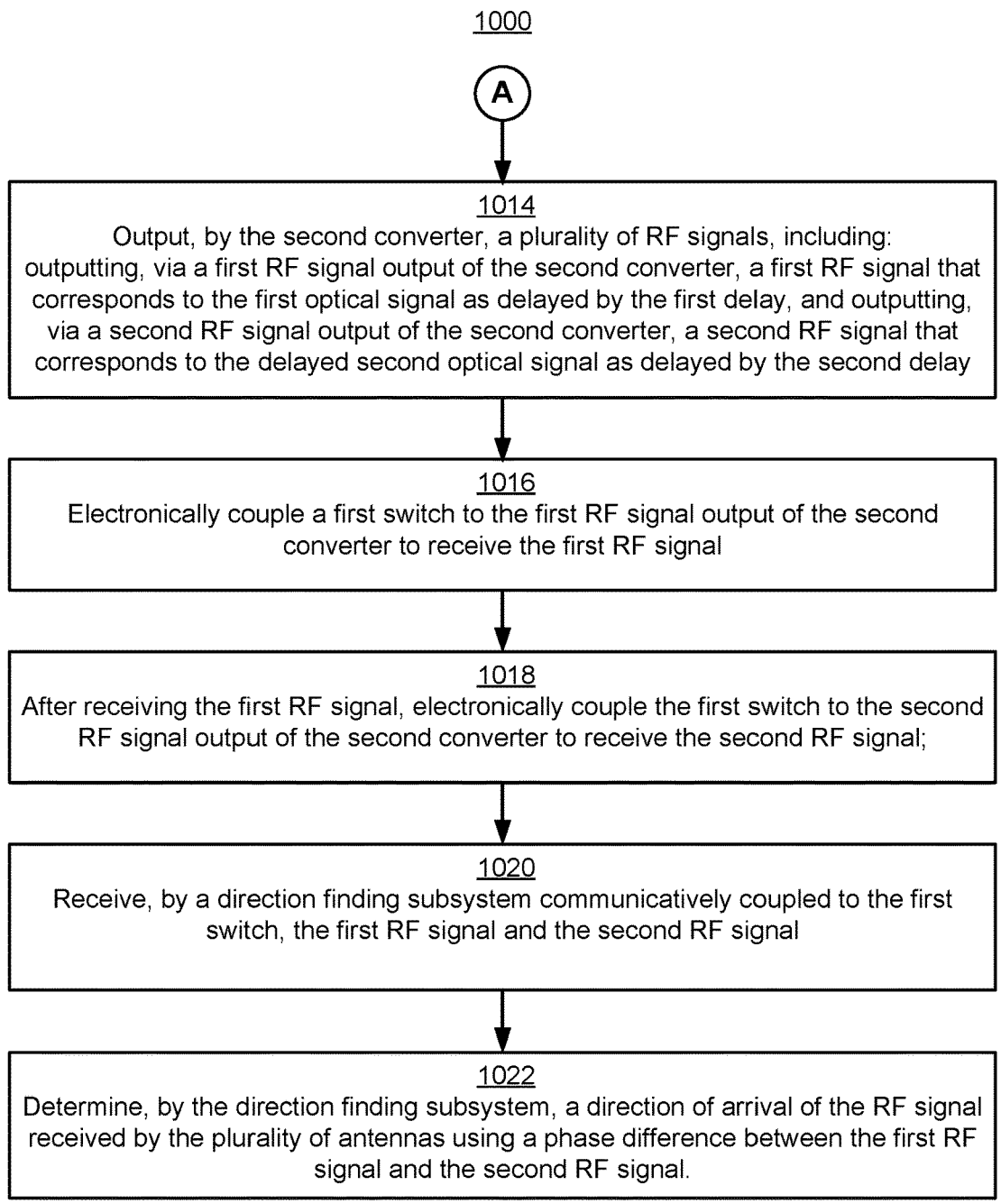
Figure 10C:
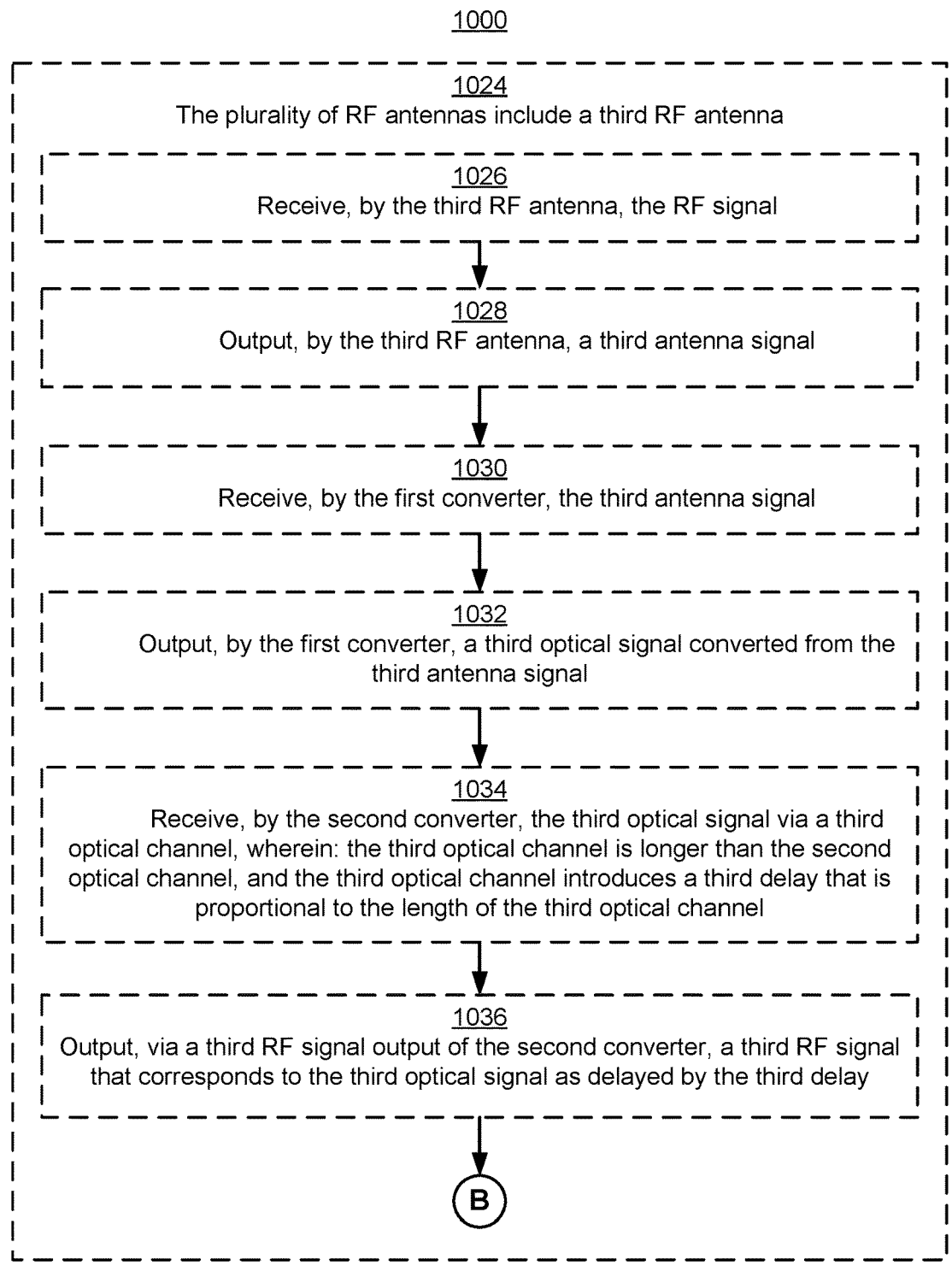
Figure 10D:
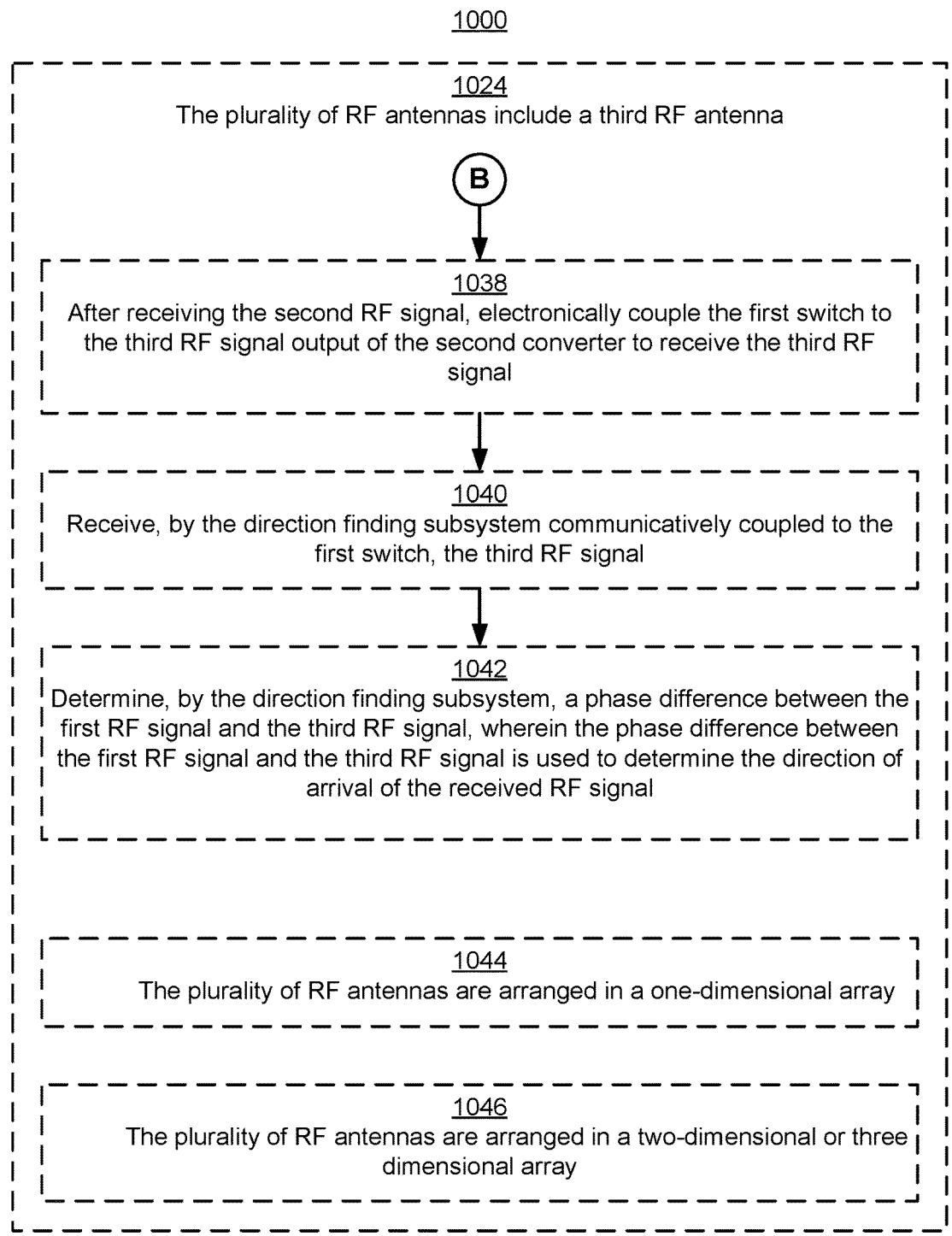

Switch 540 switches between nodes 532, 534, 536, and 538 to serially receive the output of optical to RF converter 530. Typically, delays 522-528 are configured to apply a sufficient delay to allow a rise time associated with the signal at nodes 532-538 to elapse between subsequent switch operations by switch 540 (E.G., as described further below with regard to FIG. 10).

In some embodiments, in lieu of RF to optical converter 520, optical channels 522-528, and optical to RF converter 530, single channel interferometer 104 includes delay lines (e.g., non-optical media delay lines) that apply varying amounts of delay to the antenna output signals, and switch 540 serially detects the output of the delay lines.

In some embodiments, instead of passing through RF to optical converter 520 and optical to RF converter 530 along the path indicated by channels 512 and 522, the signal output of antenna 502 is received at node 532 via an alternate channel indicated by dotted line 542. In some embodiments, alternate channel 542 includes one or more components 544 for gain and/or phase equalization to adjust the gain and/or phase of the signal on channel 542 to match any adjustments to the gain and/or phase introduced along the paths through channels 514-518, RF to optical converter 520, optical channels 524-528, and optical to RF converter 530. In this way, signals received by switch 540 via channel 542 have a phase and/or gain that is meaningfully comparable with signals received by switch 540 at nodes 534, 536, and 538.

Direction finding subsystem 546 serially receives the signal output of nodes 532-538 from switch 540. Direction finding subsystem 546 includes, e.g., a phase measurement receiver 548, as described further below with regard to FIGS. 7-9, that synchronizes the signals received by direction finding subsystem 546 to a common time epoch, e.g., by demultiplexing the signals and/or applying a delay to at least some of the signals in order to compensate for the effects of switch 540 and delays applied by optical channels 522-528. Direction finding module 550 of direction finding subsystem 546 determines a direction of arrival of the signal detected by antennas 502-508 using phase comparison data output of phase measurement receiver 548. In some embodiments, direction finding subsystem 546 includes a frequency and/or time reference source 552 that includes one or more components (e.g., clocks) for: providing an RF signal for phase calibration of one or more components of single channel interferometer 104; and providing timing for synchronizing switch 540, demux switches 702, 802, and 902 of FIGS. 7-9, and/or analog to digital converters (ADCs) 618 of FIGS. 7-9.

Figure 6:
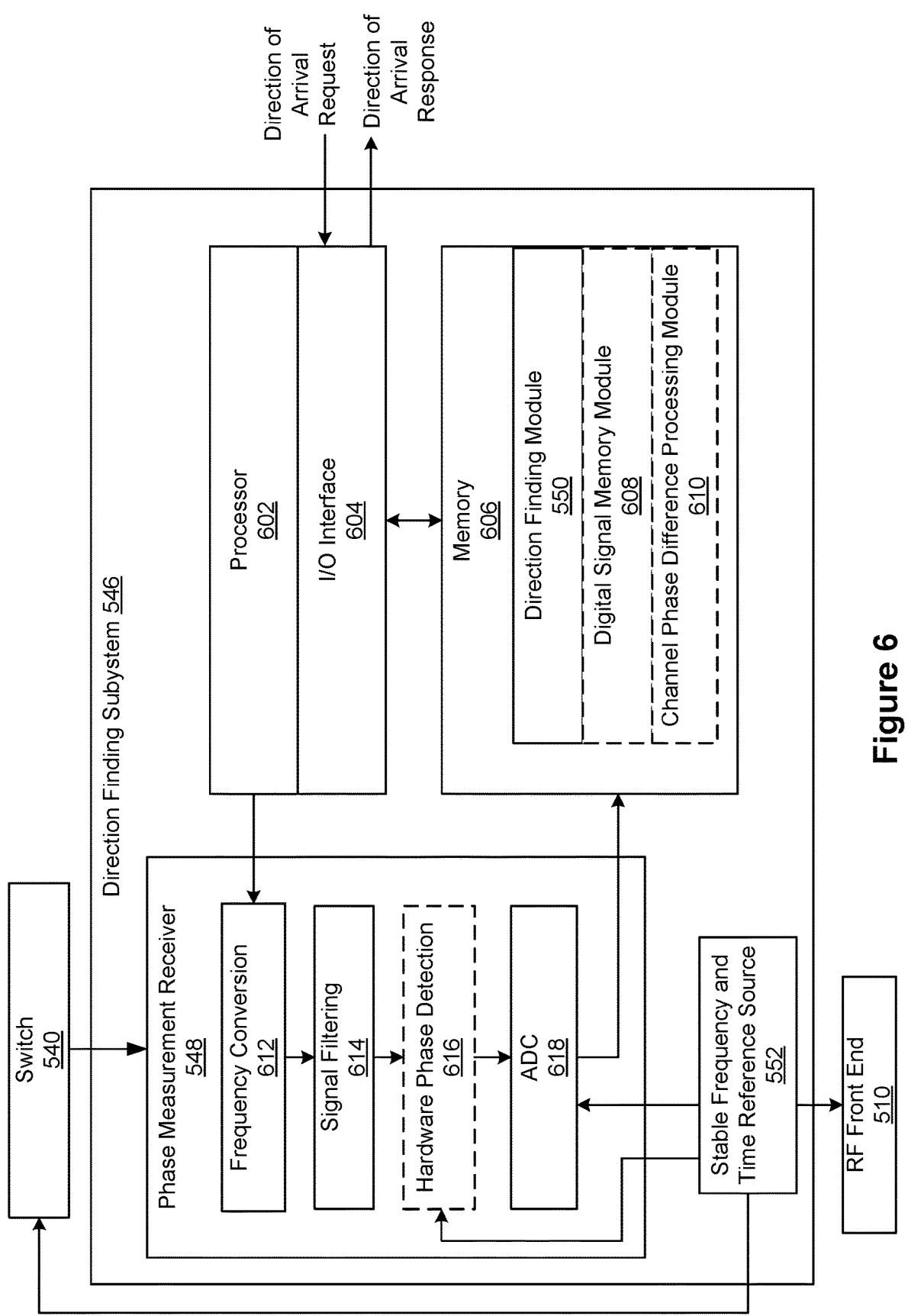
FIG. 6 is a diagram of a direction finding subsystem of a single channel interferometer, in accordance with some embodiments.

FIG. 6 is a diagram of direction finding subsystem 546, in accordance with some embodiments. Direction finding subsystem 546 typically includes one or more processor(s) 602, an input/output (I/O) interface 604, and memory 606. In some embodiments, a communication bus (not shown) is used for interconnecting these components. The communication bus optionally includes circuitry (sometimes called a chipset) that interconnects and controls communications between components of direction finding subsystem 546.

Processor(s) 602 execute modules, programs and/or instructions stored in memory 606 and thereby perform processing operations.

In some embodiments, the memory 606 stores one or more programs (e.g., sets of instructions) and/or data structures, collectively referred to as "modules" herein. In some embodiments, memory 606, or a non-transitory computer readable storage medium of memory 606, stores the following programs, modules, and data structures, or a subset or superset thereof:

Direction finding module 550 for determining a direction of arrival of the signal detected by antennas 502-508 using phase data output of phase measurement receiver 548;

Digital signal memory 608, for storing digitized samples of the output of switch 540, as described further below with regard to FIG. 9; and Channel phase difference processing module 610, which compares data stored by digital signal memory 608 to determine phase data, as described further below with regard to FIG. 9.

The above identified modules (e.g., data structures, and/or programs including sets of instructions) need not be implemented as separate software programs, procedures or modules, and thus various subsets of these modules may be combined or otherwise re-arranged in various embodiments. In some embodiments, memory 606 stores a subset of the modules identified above. Furthermore, the memory 606 may store additional modules not described above. In some embodiments, the modules stored in memory 606, or a non-transitory computer readable storage medium of memory 606, provide instructions for implementing respective operations in the methods described below. In some embodiments, some or all of these modules may be implemented with specialized hardware circuits and/or lookup tables that subsume part or all of the module functionality. One or more of the above identified elements may be executed by one or more of processor(s) 602.

The I/O interface 604 enables communication between direction finding subsystem 546 and devices that are remote from single channel interferometer 104, such as a control system of an aircraft 108, via one or more wired and/or wireless connections. For example, I/O interface 604 receives requests from a remote device for determining a direction of arrival of a signal received by single channel interferometer 104 and/or transmits determined direction of arrival information to a remote device.

Phase measurement receiver 548 includes, e.g., a frequency conversion component 612, a signal filtering component 614, a hardware phase detection component 616, and/or an ADC 618. In some embodiments, frequency conversion component 612 converts the signal output of switch 540 to an intermediate frequency. In some embodiments, signal filtering component 614 includes a filter that is designed to pass signals with frequencies within a frequency range (e.g., such that the filter can be tuned to receive frequencies within the predetermined frequency range and/or the single channel interferometer can tune the filter to lock onto the strongest signal among multiple signals received at various frequencies). The frequency range of signal filtering component 614 is, e.g., a static frequency range and/or an adjustable frequency range (e.g., adjustable in response to user input and/or automatically adjusted). Phase measurement receiver 548 performs phase detection using a hardware-implemented phase detection component 616 and/or a software implemented phase detection component (e.g., of direction finding module 550).

Figure 7:
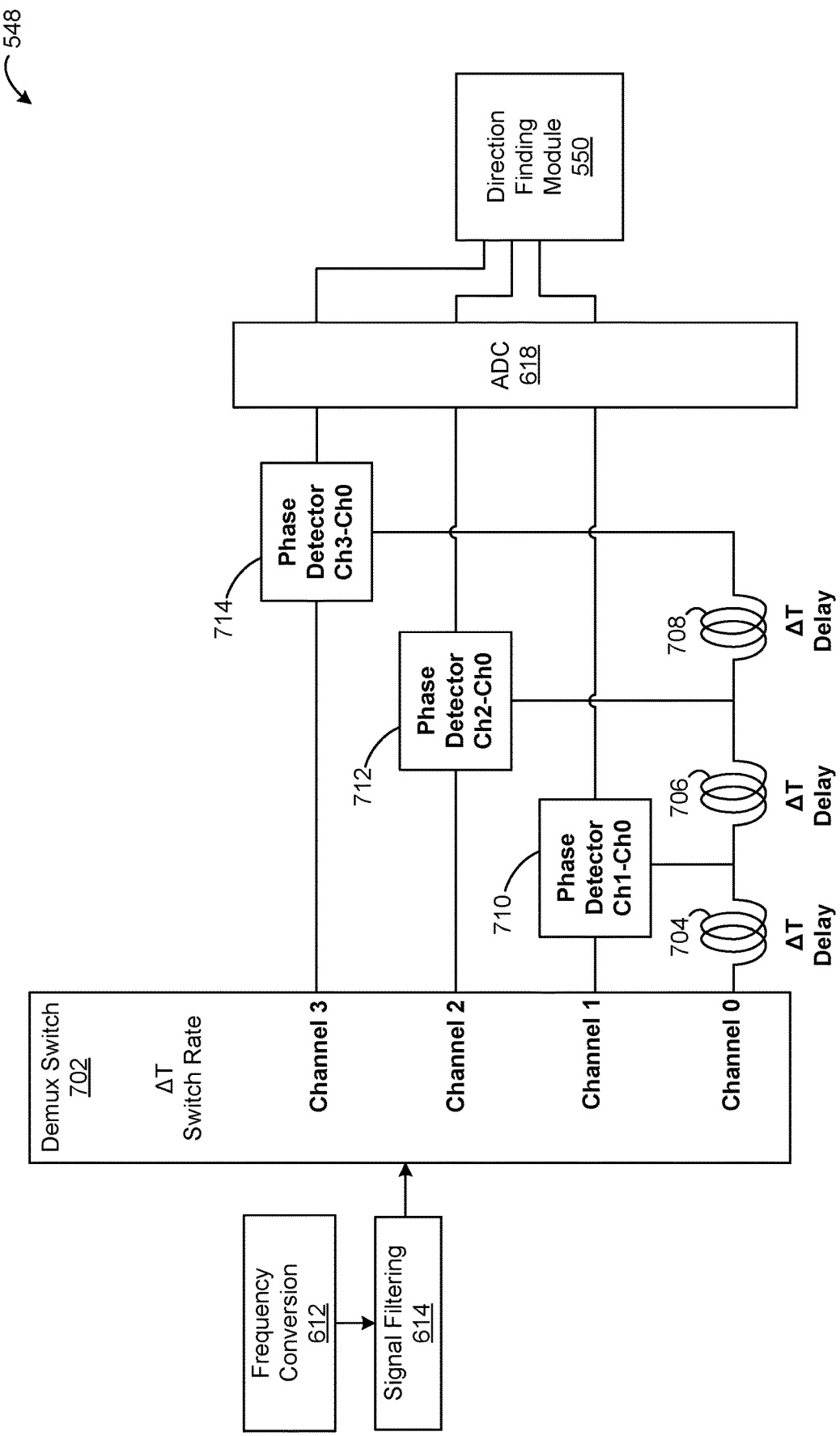
FIG. 7 illustrates a phase measurement receiver, in accordance with some embodiments.

FIG. 7 illustrates a phase measurement receiver 548, in accordance with some embodiments. In some embodiments, a signal received by phase measurement receiver 548 is processed by frequency conversion component 612 and/or signal filtering component 614, e.g., as described with regard to FIG. 6, before arriving at demultiplexer (demux) switch 702. The switch rate ΔT of demux switch 702 is the same as the ΔT dwell time of switch 540. As discussed further above, switch 540 switches from node 532 to node 534, from node 534 to node 536, and from node 536 to 538, to serially output signals corresponding to the signals at nodes 532-538. Demux switch 702 receives the serialized signal and performs switching to output the received signals at the outputs indicated by "Channel 0," which corresponds to the output of node 532; "Channel 1," which corresponds to the output of node 534; "Channel 2," which corresponds to the output of node 536; and "Channel 3," which corresponds to the output of node 538.

Delays 704, 706, and 708 are delays that delay a signal by an amount of time (e.g., by a time ΔT that is equal to the ΔT dwell time of demux switch 702 and switch 540). In some embodiments, delays 704, 706, and 708 are analog delays, such as optical fiber delays (e.g., the output of Channel 0 is converted from an RF signal to an optical signal prior to the first optical fiber delay (e.g., 704) and the signal output of the last optical delay (e.g., 708) is converted from an optical signal to an RF signal).

Delay 704 is applied to the signal output of Channel 0. At the output of delay 704, the signal on channel 0 is synchronized to the same time epoch as the signal output of Channel 1 (the relative phase between Channel 1 and Channel 0 is the same as the relative phase between the input detected at antenna 502 and antenna 504, because delay 704 applies the same delay to Channel 0 that as the delay that was applied to Channel 1 by delay 524). Phase detector 710 determines a phase between the Channel 0 signal and the Channel 1 signal. Channel 2 is synchronized to a common time epoch with channel 0 by delay 706, which applies the same delay to Channel 0 as the delay that was applied to Channel 2 by delay 526. Phase detector 712 determines a phase between the Channel 0 signal and the Channel 2 signal. Channel 3 is synchronized to a common time epoch with Channel 0 by delay 710, which applies the same delay to Channel 0 as the delay that was applied to Channel 3 by delay 528. Phase detector 714 determines a phase between the Channel 0 signal and the Channel 3 signal.

In some embodiments, the phases determined by phase detectors 710, 712, and 714 are converted from analog signals to digital signals by ADC 618. Direction finding module 550 uses the phases determined by phase detectors 710, 712, and 714 to determine a direction of arrival of the signal detected by antennas 502-508 (e.g., as discussed further below with regard to FIG. 10).

Figure 8:
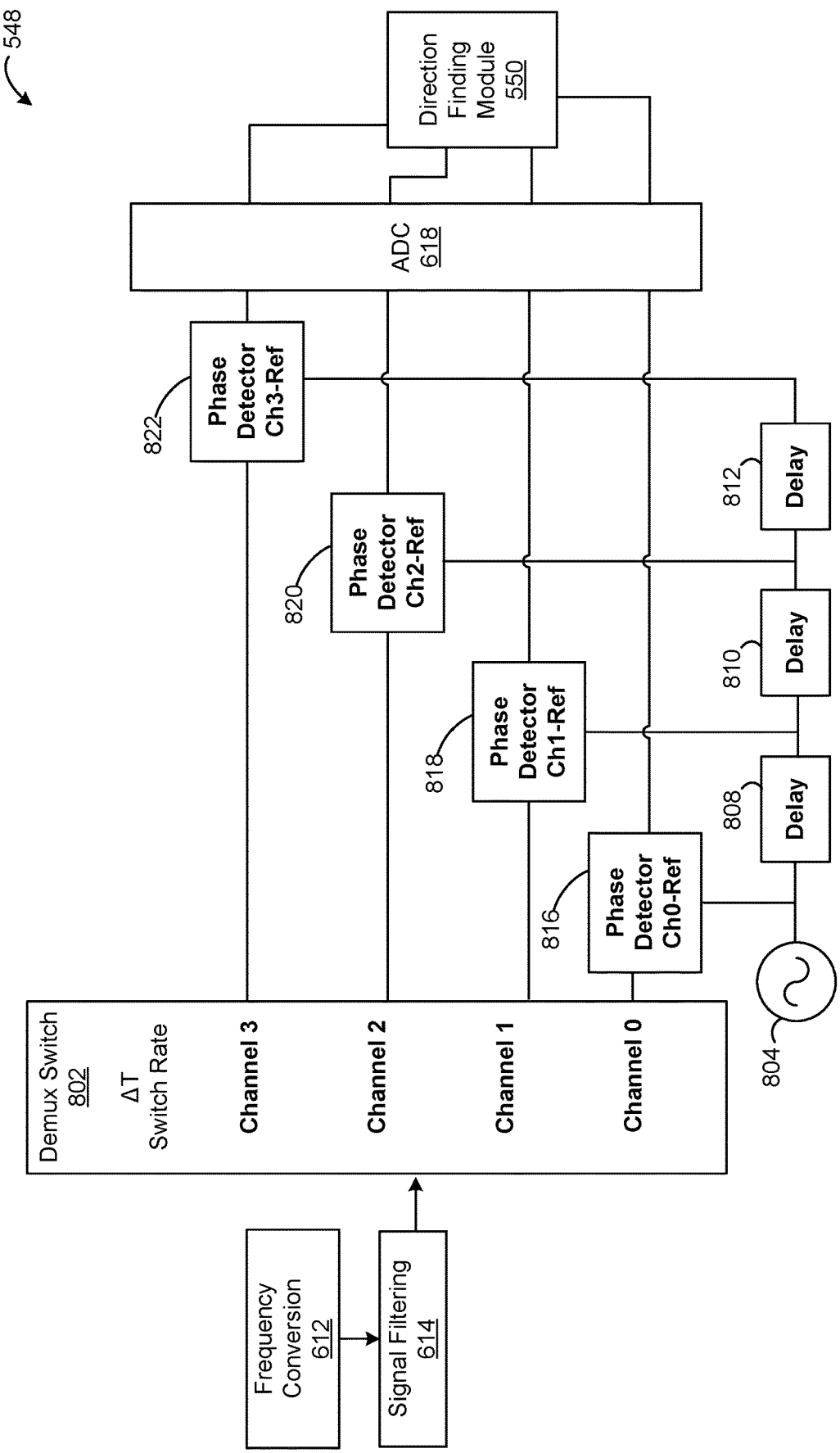
FIG. 8 illustrates a phase measurement receiver that uses a reference signal generator for phase detection, in accordance with some embodiments.

FIG. 8 illustrates a phase measurement receiver 548 that uses a reference signal generator 804 (e.g., an oscillator) for phase detection, in accordance with some embodiments. A demux switch 802 receives the serialized signal from switch 540 (e.g., as processed by frequency conversion component 612 and/or signal filtering component 614), and performs switching to output the received signals at the outputs indicated by "Channel 0," which corresponds to the output of node 532; "Channel 1," which corresponds to the output of node 534; "Channel 2," which corresponds to the output of node 536; and "Channel 3," which corresponds to the output of node 538. The frequency set-on accuracy between the reference signal generator and the received signal frequency becomes increasingly demanding as the channel dwell time ΔT of the multiplexer switch 540 is increased.

In FIG. 8, the signal outputs of Channel 0, Channel 1, Channel 2, and Channel 3 are compared with a reference signal generated by reference signal generator 804. While this embodiment requires a very accurate set-on of the reference signal to the received RF signal frequency; it facilitates the use of digital time delays of the reference signal which can be more compact and lower cost compared to analog time delays.

Delays 808, 810, and 812 delay the reference generator signal generated by reference signal generator 804 by an amount of time ΔT (e.g., that is equal to the ΔT dwell time of demux switch 802 and switch 540). In some embodiments, delays 808, 810, and 812 are analog delays, such as optical fiber delays, and/or digital delays.

Phase detector 816 determines a phase between the Channel 0 signal and the reference signal output of reference signal generator 804. A delay 808 applies a first delay to the signal output of the reference signal generator 804. Phase detector 818 determines a phase between the Channel 1 signal and the reference signal from 804 as delayed by delay 808. A delay 810 applies a second delay to the signal output of the reference signal generator 804. Phase detector 820 determines a phase between the Channel 2 signal and the reference signal from 804 as delayed by delay 808 and delay 810. A delay 812 applies a third delay to the signal output of the reference signal generator 804. Phase detector 822 determines a phase between the Channel 3 signal and the reference signal from 804 as delayed by delays 808, 810, and 812.

In some embodiments, the phases determined by phase detectors 816, 818, 820, and 822 are converted from analog signals to digital signals by ADC 618. Direction finding module 550 uses the phases determined by phase detectors 816, 818, 820 and 822 to determine a direction of arrival of the signal detected by antennas 502-508 (e.g., as discussed further below with regard to FIG. 10).

Figure 9:
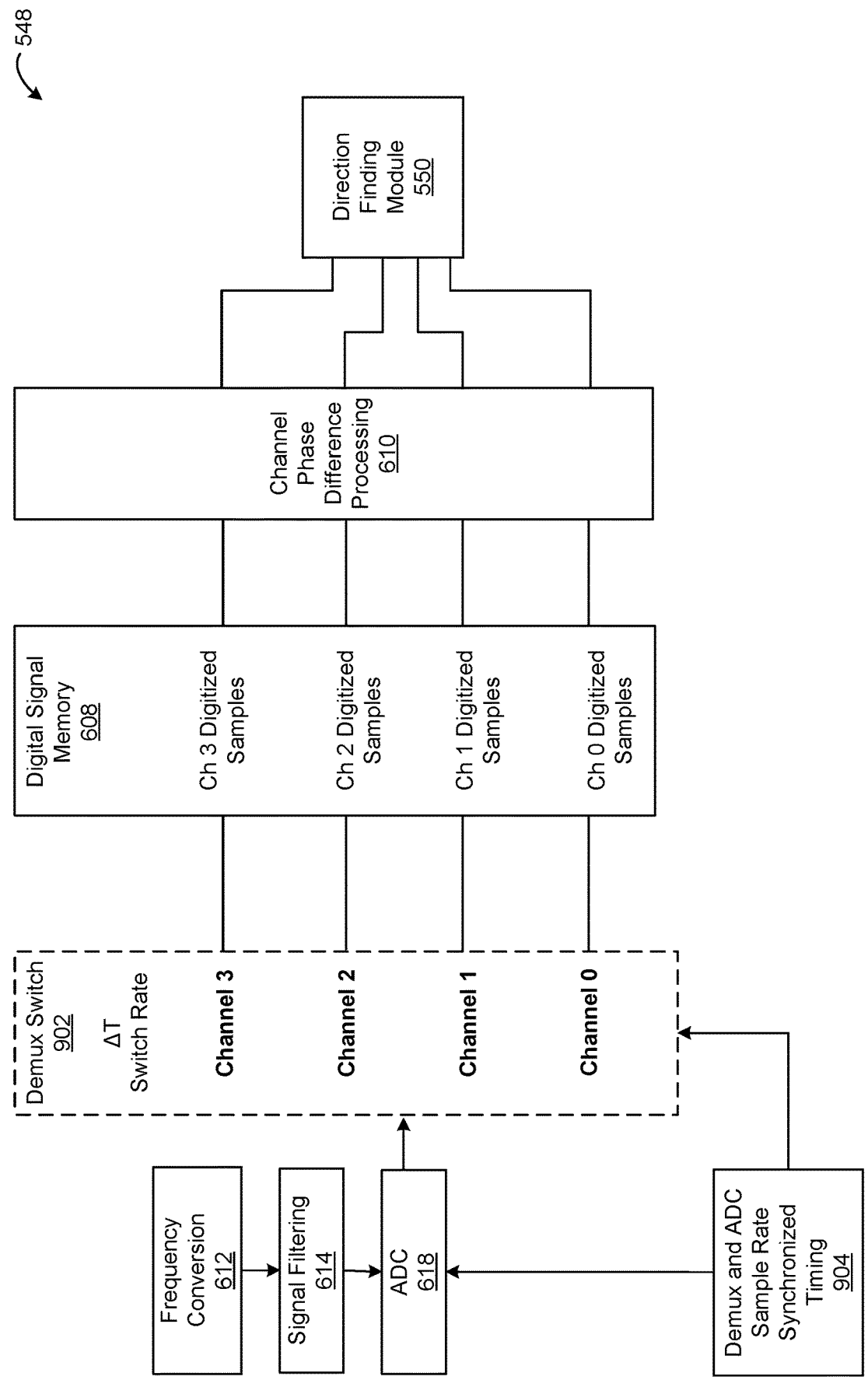
FIG. 9 illustrates a phase measurement receiver that uses a digital signal memory for channel synchronization, in accordance with some embodiments.

FIG. 9 illustrates a phase measurement receiver 548 that uses a digital signal memory 608 for channel synchronization, in accordance with some embodiments. In some embodiments, a demux switch 902 receives the serialized signal from switch 540. In some embodiments, the serialized signal from switch 540 is processed by frequency conversion component 612, signal filtering component 614 (which may include I/Q decomposition), and/or one or more ADCs 618 (e.g., an I component ADC and a Q component ADC).

The demux switch 902 performs switching to output the received signals in parallel at the outputs indicated by "Channel 0," which corresponds to the output of node 532; "Channel 1," which corresponds to the output of node 534; "Channel 2," which corresponds to the output of node 536; and "Channel 3," which corresponds to the output of node 538. In some embodiments, a timing device 904 (e.g., frequency and/or time reference source 552) provides synchronized timing for demux switch 902 and ADC 618.

In FIG. 9, the signal outputs of switch 540 (and, when demux 902 is used, of demux 902) are stored to digital signal memory 608, such that the signals are synchronized to a common time epoch as Channel 0 digitized samples, Channel 1 digitized samples, Channel 2 digitized samples, and Channel 3 digitized samples. A phase difference processing device 610 determines a phase between the Channel 1 digitized samples and the Channel 0 digitized samples, a phase between the Channel 2 digitized samples and the Channel 1 digitized samples, and a phase between the Channel 3 digitized samples and the Channel 2 digitized samples. The determined phases are received by direction finding module 550 from channel phase difference processing module 610. Direction finding module 550 uses the phases determined by channel phase difference processing module 610 to determine a direction of arrival of the signal detected by antennas 502-508 (e.g., as described below with regard to FIG. 10).

While FIGS. 5-9 describe an interferometer 104 that includes four antennas and phase determination based on the signal as detected by the four antennas, it will be recognized that interferometer 104 may include other numbers of antennas. For example, an interferometer 104 that includes six antennas will produce six channels of data that can be used to determine five phase difference values (e.g., using a phase measurement receiver 548 as described with regard to FIG. 7 or 9) or six phase difference values (e.g., using a phase measurement receiver with a reference source generator 804 as described with regard to FIG. 8).

FIGS. 10A-10F are flow diagrams illustrating a method 1000 for determining a direction of arrival of an RF signal, in accordance with some embodiments. The method 1000 is performed at a device, such as single channel interferometer 104. In some embodiments, at least some of the instructions for performing the method 1000 (e.g., as described with regard to operation 1022 below) are stored in the memory 606 and executed by processor 602.

The device receives (1002), by a plurality of radio frequency (RF) antennas (e.g., N antennas) including a first antenna (e.g., antenna 502) and a second antenna (e.g., antenna 504), an RF signal (e.g., an RF signal transmitted by a signal transmitter 102).

The device outputs (1004), by the plurality of RF antennas, a plurality of antenna signals including a first antenna signal (e.g., via channel 512) and a second antenna signal (e.g., via channel 514).

The device receives (1006), by a first converter (e.g., RF to optical converter 520), the plurality of antenna signals including the first antenna signal and the second antenna signal.

The device outputs (1008), by the first converter (e.g., RF to optical converter 520), a plurality of optical signals, including a first optical signal converted from the first antenna signal and a second optical signal converted from the second antenna signal. For example, the first optical signal is output via optical channel 522 and the second optical signal is output via optical channel 524.

The device receives (1010), by a second converter (e.g., optical to RF converter 530), the plurality of optical signals. The first optical signal of the plurality of optical signals is received by the second converter from the first converter via a first optical channel (e.g., 522) with a first length. The first optical channel introduces a first delay that is proportional to the length of the first optical channel. The second optical signal of the plurality of optical signals is received via a second optical channel (e.g., 524) with a second length that is longer than the first length. The second optical channel introduces a second delay that is proportional to the length of the second optical channel. In some embodiments (1012), at least one of the first optical channel or the second optical channel includes optical fiber. For example, optical channel 524 includes a length of optical fiber (such as optical fiber that includes a spool of optical fiber configured to apply a predetermined delay) that is longer than a length of optical fiber of optical channel 522.

The device outputs (1014), by the second converter (e.g., optical to RF converter 530), a plurality of RF signals. The device outputs, via a first RF signal output of the second converter 530 (e.g., at node 532), a first RF signal that corresponds to the first optical signal as delayed by the first delay. The device outputs (1014), via a second RF signal output of the second converter 530 (e.g., at node 534), a second RF signal that corresponds to the delayed second optical signal as delayed by the second delay.

In some embodiments, the device electronically couples (1016) a first switch 540 to the first RF signal output of the second converter 530 (e.g., optical to RF converter 530), for example, at node 532, to receive the first RF signal. After receiving the first RF signal, the device electronically couples (1018) the first switch 540 to the second RF signal output of the second converter (e.g., optical to RF converter 530), for example, at node 534, to receive the second RF signal. In some embodiments, the switch is a multiplexer, such as a single pole, N throw switch that operates at a switching speed equal to the time delay between the antenna channels. In some embodiments, the switch 540 is a commutating switch.

The device receives (1020), by a direction finding subsystem 546 that is communicatively coupled to the first switch 540, the first RF signal and the second RF signal. In some embodiments, direction finding subsystem 546 uses phase measurement receiver 548 to synchronize the first RF signal and the second RF signal to a common time epoch. Because of the unequal electrical path length seen by the first RF signal and the second RF signal, there is a difference in phase caused solely by the delay lines (e.g., 522-528) that requires correction in the direction finding processing. For example, phase measurement receiver 548 includes a demultiplexing switch (e.g., 702, 802, 902) to deserialize the first RF signal and the second RF signal received from first switch 540, and applies a delay to at least one of the first RF signal and the second RF signal by analog and/or digital means (e.g., as described with regard to FIGS. 7-9).

The device determines (1022), by the direction finding subsystem 546, a direction of arrival of the RF signal received by the plurality of antennas using a phase difference between the first RF signal and the second RF signal (e.g., as corrected by the phase measurement receiver 548 as described with regard to FIGS. 7-9, for example, by delays applied to one or more channels). For example, direction finding subsystem 546 uses a lookup table (e.g., stored in hardware or software) to determine a direction of arrival based on at least the phase difference between the first RF signal and the second RF signal. In some embodiments, interferometer 104 includes more than two antennas, and the direction or arrival is determined using the phase difference between the first RF signal and the second RF signal, a phase difference between the first RF signal and a third RF signal, and so on. In some embodiments, a direction finding subsystem 546 of interferometer 104 includes a reference signal generator 804, and a phase is determined between the reference signal and one or more channels corresponding to antennas of the interferometer. In some embodiments, the direction of arrival is determined, using the following formula:

$$\cos(\Phi) = \Delta(\psi)^* \frac{\lambda}{2\pi d}$$

where $\Phi$=angle of arrival, d=distance between adjacent antennas, $2\pi/\lambda$=a free space propagation constant and $\Delta\psi$=antenna-to-antenna phase angle. Well known interferometry calculations based on various arrangements of antennas are used to determine the direction of arrival using multiple phase determinations.

In some embodiments (1024), the plurality of RF antennas include a third RF antenna (e.g., 506). The device receives (1026), by the third RF antenna, the RF signal (e.g., from the signal transmitter 102). The device outputs (1028), by the third RF antenna (e.g., 506), a third antenna signal (e.g., via channel 516). The device receives (1030), by the first converter (e.g., RF to optical converter 520), via channel 516, the third antenna signal. The device outputs (1032), by the first converter (e.g., RF to optical converter 520), a third optical signal converted from the third antenna signal. The device receives (1034), by the second converter (e.g., optical to RF converter 530), the third optical signal via a third optical channel (e.g., optical channel 526). The third optical channel 526 is longer than the second optical channel 524. For example, the third optical channel includes a length of optical fiber (e.g., including a spool of optical fiber) that is longer than the length of optical fiber along channel 524. The third optical channel introduces a third delay that is proportional to the length of the third optical channel (e.g., the delay introduced by optical channel 526 is longer than the delay introduced by optical channel 524). The device outputs (1036), via a third RF signal output of the second converter (e.g., optical to RF converter 530), at node 536, a third RF signal that corresponds to the third optical signal as delayed by the third delay. After receiving the second RF signal, the device electronically couples (1038) the first switch 540 to the third RF signal output of the second converter (e.g., optical to RF converter 530), at node 536, to receive the third RF signal. The device receives (1040), by the direction finding subsystem 546, the third RF signal from electronic switch 540 (after receiving the first RF signal and the second RF signal). In some embodiments, direction finding subsystem 546 uses phase measurement receiver 548 to synchronize the first RF signal, the second RF signal, and the third RF signal to a common time epoch. For example, phase measurement receiver 548 includes a demultiplexing switch (e.g., 702, 802, 902) to deserialize the first RF signal, the second RF signal, and the third RF signal received from first switch 540, and applies a delay to at least one of the first RF signal and the second RF signal by analog and/or digital means (e.g., as described with regard to FIGS. 7-9). The device determines (1042), by the direction finding subsystem 546, a phase difference between the first RF signal and the third RF signal. The phase difference between the first RF signal and the third RF signal is used (e.g., in addition to the phase difference between the first RF signal and the second RF signal, as discussed with regard to operation 1022) to determine the direction of arrival of the received RF signal.

In some embodiments (1044), the plurality of RF antennas are arranged in a one-dimensional array (e.g., as illustrated by linear array 104a of FIG. 4A).

In some embodiments (1046), the plurality of RF antennas are arranged in a two-dimensional array (e.g., as illustrated by planar array 104b of FIG. 4B or circular array 104c of FIG. 4C) or a three dimensional array (e.g., as illustrated by cylindrical array 104d of FIG. 4D).

In some embodiments (1048), electronically coupling the first switch 540 to the second RF signal output (e.g., node 534) of the second converter 530 to receive the second RF signal occurs a predetermined amount of time ($\Delta T$) after electronically coupling the first switch to the first RF signal output (e.g., node 532) of the second converter 530 to receive the first RF signal. In some embodiments, switch 540 has a switching rate of e.g., 1 ns-1000 ns, such as 200 ns. For example, when $\Delta T$ (e.g., 200 ns) has elapsed after first switch 540 electronically couples to node 532, first switch 540 electronically couples to node 534; when $\Delta T$ (e.g., 200 ns) has elapsed after first switch 540 electronically couples to node 534, first switch 540 electronically couples to node 536; and when $\Delta T$ (e.g., 200 ns) has elapsed after first switch 540 electronically couples to node 536, first switch 540 electronically couples to node 538.

In some embodiments, the device receives (1050), by a second switch (e.g., demultiplexer switch 702, 802, or 902) that is communicatively coupled to the direction finding subsystem 546, the first RF signal. For example, demultiplexer switch (702, 802, 902) is a switch that switches at the same switching rate as first switch 540. The device outputs (1052), by the second switch (702, 802, 902), the first RF signal. After the predetermined amount of time ($\Delta T$), the device receives (1054), by the second switch (702, 802, 902), the second RF signal (e.g., from switch 540). The device outputs (1056), by the second switch (702, 802, 902), the second RF signal.

In some embodiments, the device applies (1058), by a delay device (e.g., 704 or 608), a delay to the first RF signal. In some embodiments, the delay device includes (1060) optical fiber (e.g., as shown at 704).

In some embodiments, the device applies (1062), by a delay device (e.g., 808), a delay to a reference signal generated by a reference signal generator 804. Delay device 808 is, e.g., an analog delay device, such as an optical fiber delay, and/or a digital delay device. The phase difference between the first RF signal and the second RF signal is determined using: a phase difference between the first RF signal and the reference signal (e.g., by phase detector 816), and a phase difference between the second RF signal and the delayed reference signal (e.g., by phase detector 818). In some embodiments, the reference signal generator 804 is configured to initiate a waveform each time the demux switch 802 switches.

In some embodiments, the device stores (1064), by a memory device (e.g., digital signal memory 608), a digitized representation of the first RF signal output of the second switch (e.g., Channel 0 of demux switch 902) and the device stores, by the digital signal memory 608, a digitized representation of the second RF signal output of the second switch (e.g., Channel 1 of demux switch 902), wherein a digital delay is applied to the second RF signal stored by digital signal memory 608.

Figure 11B:
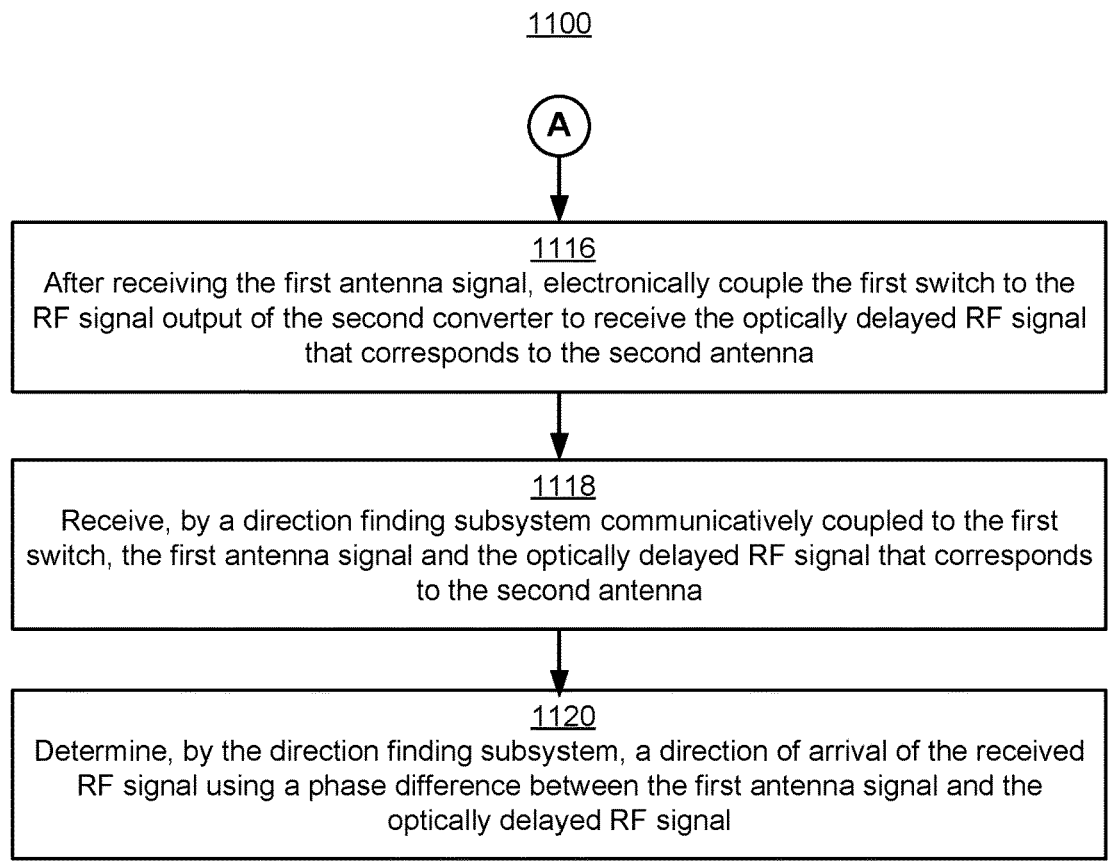

FIGS. 11A-11B are flow diagrams illustrating a method 1100 for determining a direction of arrival of an RF signal, in accordance with some embodiments. The method 1100 is performed at a device, such as single channel interferometer 104. In some embodiments, at least some of the instructions for performing the method 1100 (e.g., as described with regard to operation 1120 below) are stored in the memory 606 and executed by processor 602.

In some embodiments, a device for determining a direction of arrival of an RF signal includes receiving (1102), by a plurality of radio frequency RF antennas including a first antenna and (e.g., 502) a second antenna (e.g., 504), an RF signal.

The device outputs (1104), by the plurality of RF antennas (e.g., 502 and 504), a plurality of antenna signals including a first antenna signal (e.g., via channel 542) and a second antenna signal (e.g., via channel 514).

The device receives (1106), by a first converter (e.g., RF to optical converter 520) that is electrically coupled to the plurality of RF antennas, the second antenna signal.

The device outputs (1108), by the first converter (e.g., RF to optical converter 520), an optical signal converted from the second antenna signal (e.g., via optical channel 524).

The device receives (1110), by a second converter (e.g., optical to RF converter 530), the optical signal, wherein the optical signal is received via an optical channel (e.g., optical channel 524) that introduces a delay proportional to the length of the optical channel. For example, the optical channel is an optical fiber channel (e.g., including a spool of optical fiber).

The device outputs (1112), by an RF signal output of the second converter (e.g., optical to RF converter 530), an optically delayed RF signal that corresponds to the second antenna 504 (e.g., at node 534).

The device electronically couples (1114) a first switch 540 to a first output of the first antenna to receive the first antenna signal (e.g., at node 532). In some embodiments, a gain and/or phase matching adjustment is applied to the first antenna signal by gain and/or phase equalization component 544 (e.g., as described with regard to FIG. 5) between the output of first antenna 502 and node 532.

After receiving the first antenna signal, the device electronically couples (1116) the first switch 540 to the RF signal output of the second converter 530 (e.g., at node 534) to receive the optically delayed RF signal that corresponds to the second antenna 504.

The device receives (1118), by a direction finding subsystem 546 communicatively coupled to the first switch 540, the first antenna signal and the optically delayed RF signal that corresponds to the second antenna. In some embodiments, phase measurement receiver 548 of direction finding subsystem 546 synchronizes the signals received by direction finding subsystem 546 to a common time epoch, e.g., by demultiplexing and delaying the signals to reverse the effects of switch 540 and the delay applied by optical channel 524 and/or gain and/or phase equalization component 544.

The device determines (1120), by the direction finding subsystem, a direction of arrival of the received RF signal using a phase difference between the first antenna signal and the optically delayed RF signal.

Figure 12A:
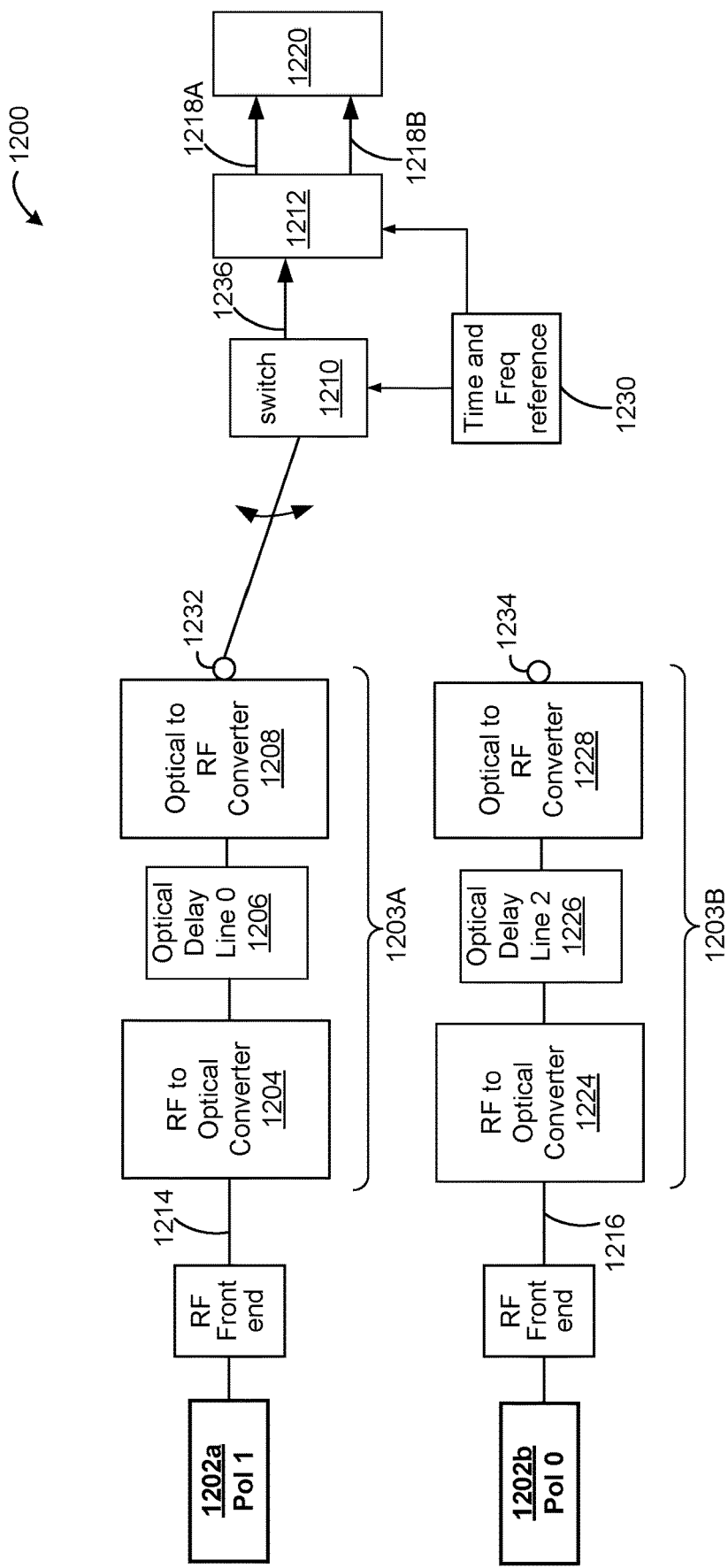
FIG. 12A is a block diagram of a two-channel polarimeter using two optical delay lines, in accordance with some embodiments.
Figure 12B:
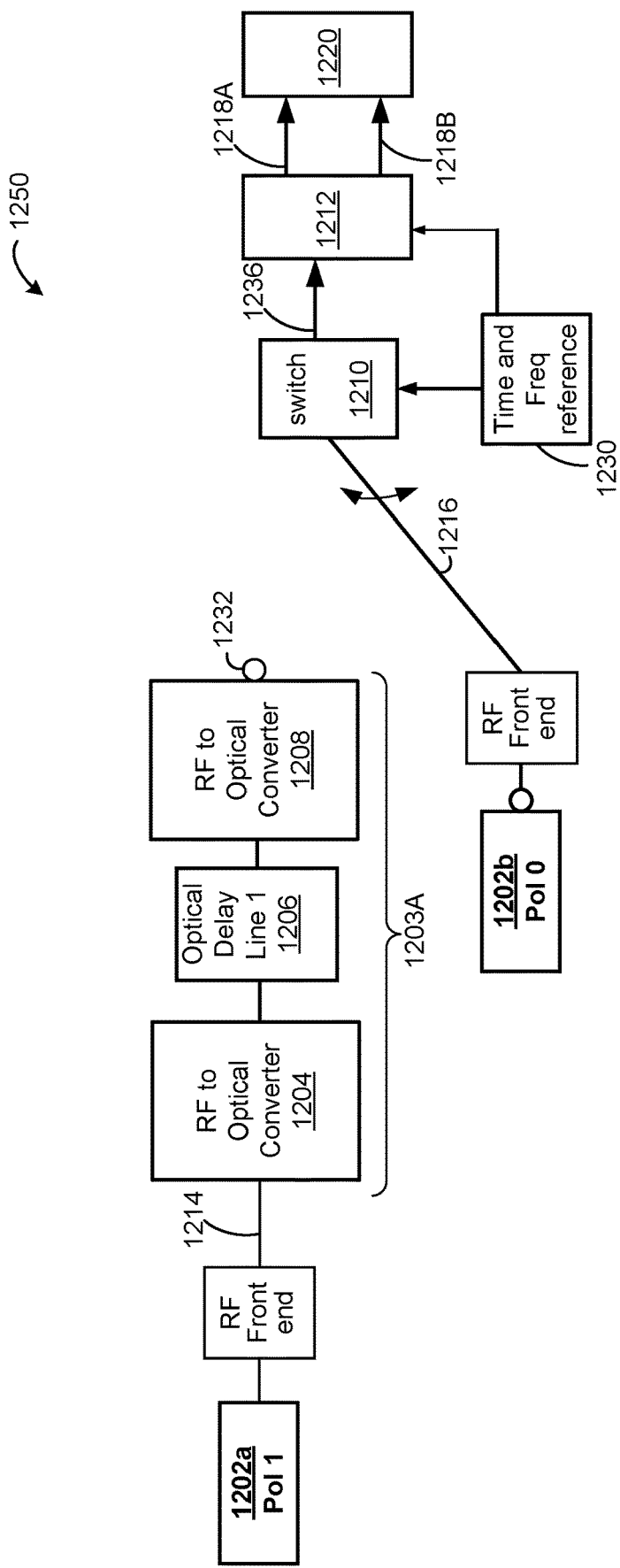
FIG. 12B is a block diagram of another two-channel polarimeter using a single optical delay line, in accordance with some embodiments.

FIG. 12A is a block diagram of a two-channel polarimeter 1200 using two optical delay lines 1206 and 1226, in accordance with some embodiments, and FIG. 12B is a block diagram of another two-channel polarimeter 1250 using a single optical delay line 1206, in accordance with some embodiments. Referring to FIG. 12A, the polarimeter 1200 includes a first antenna 1202a and a second antenna 1202b used to receive an input RF signal. The first and second antennas 1202 and 1202b are coupled to respective RF front ends configured to generate a first antenna signal 1214 and a second antenna signal 1216, respectively. The first and second antenna signals 1214 and 1216 are orthogonally polarized, and pass through two delay paths 1203A and 1203B to generate a first RF signal 1232 and a second RF signal 1234, respectively. The two delay paths 1203A and 1203B introduce an optical delay between the two RF outputs, e.g., by introducing a first delay to the first antenna signal 1214 and a second delay to the second antenna signal 1216. In some embodiments, a switch 1210 is applied to alternately select the first and second antenna signals 1214 and 1216 in a time-multiplexed manner. A receiver device 1212 (also called a polarization analyzer) is configured to measure amplitudes and phases of the first and second RF signals 1232 and 1234, and a processor 1220 is configured to analyze the amplitudes and phases of the first and second RF signals 1232 and 1234 to determine the polarization of the input RF signal, e.g., a polarization angle and/or type of the input RF signal. The optical delay allows the first and second RF signals 1232 and 1234 to be measured sequentially. Accordingly, a single set of relatively light, low power, and inexpensive RF and digital processing hardware (e.g., the receiver device 1212 and processor 1220) can be used to measure both of the first and second RF signals 1232 and 1234.

In some implementations, the first and second RF antennas 1202a and 1202b are sensitive to signal polarization. During operation of the polarimeter 1200, the first RF RF antenna 1202a and second RF antenna 1202b receive an input RF signal and respond to distinct polarization components of the input RF signal. In some embodiments, the antennas 1202a and 1202b are configured to determine the polarization components of the input RF signal, e.g., two orthogonal polarization components in the input RF signal. In an example, the first and second RF antennas 1202a and 1202b extract horizontal and vertical polarization components, respectively. Stated another way, in some embodiments, the first RF antenna 1202a and second RF antenna 1202b are configured to provide two orthogonal and linear polarization components of the input RF signal. The input RF signal has vertically polarized and horizontally polarized RF signal components. The first RF antenna 1202a and corresponding RF front end is configured to output the first antenna signal 1214 having a first polarization (e.g., the vertically polarized RF signal), while the second RF antenna 1202b is configured to output the second antenna signal 1216 having a second polarization orthogonal to the first polarization (e.g., the horizontally polarized RF signal).

In another example, the first and second RF antennas 1202a and 1202b extract left circular and right circular polarization components, respectively. Specifically, in some embodiments, the first RF antenna 1202a and second antenna 1202b are configured to receive dual orthogonal circular polarization components in the input RF signal. Optionally, the input RF signal is circularly polarized, and includes two rotating plane waves of equal amplitude and differing in phase by ±90°. Optionally, the input RF signal is elliptically polarized, and includes two rotating plane waves having distinct amplitudes and related in phase, where the relative phase is ±90° and the tilt angle for maximum signal needs to be determined.

In some embodiments, the delay path 1203A of the polarimeter 1200 includes an RF-to-optical converter 1204 configured to receive the first antenna signal 1214 from the first RF antenna 1202a and corresponding RF front end. The delay path 1203B includes an RF-to-optical converter 1224 to receive a second antenna signal 1216 from the second RF antenna 1202b. The RF-to-optical converters 1204 and 1224 convert the first and second antenna signals received from the first RF antenna 1202a and second RF antenna 1202b into a first optical signal and a second optical signal, respectively.

The polarimeter 1200 applies, by a delay device, a first optical delay and a second optical delay to the first and second optical signals, respectively. In some embodiments, the delay device includes an optical delay line 1206 or 1226. The optical delay lines 1206 and 1226 may include different lengths of optical transmission lines to introduce different optical delays to the optical signals generated by the converters 1204 and 1224. In some embodiments, the delay device is applied in one of the two delay paths 1203 (i.e., either 1206 or 1226 is omitted). The delay device is applied in a first delay path 1203A originating from the first RF antenna 1202a or in a second delay path 1203B originating from the second RF antenna 1202b. Such a delay device introduces a differential delay between the first and second optical signals that propagate in these two delay paths 1203.

After the optical delay is applied via at least one of the two delay paths 1203A and 1203B, an optical-to-RF converter 1208 is used to convert the first optical signal into a first RF signal 1232, and an optical-to-RF converter 1228 is used to convert the second optical signal into a second RF signal 1234. A switch 1210 (specifically, an RF electronic switch) is coupled to the first and second delay paths 1203A and 1203B, and configured to receive the first RF signal 1232 outputted by the optical-to-RF converter 1208. In some embodiments, the switch 1210 receives a time and/or frequency reference signal 1230 to benchmark the arrival of the first RF signal 1232 from the RF-to-optical converter 1208. After receiving the first RF signal 1232, the switch 1210 is controlled to receive the second RF signal 1234 outputted from the second optical-to-RF converter 1228. That said, the first and second RF signals 1232 and 1234 are selected by the switch 1210 in a time-multiplexed manner to pass the initially time coincident signals sequentially.

In some embodiments, a receiver 1212 includes a polarization analyzer 1212 communicatively coupled to the switch 1210 and configured to process the RF signal 1236 sequentially the first RF signal 1232 and the second RF signal 1234 controlled by the time and/or frequency reference 1230. Specifically, the polarization analyzer 1212 temporally demultiplexes the first and second RF signals 1232 and 1234 from the RF signal 1236 based on the time and/or frequency reference 1230, counteracts the optical delay applied by the delay device 1206 or 1226, and/or applies gain and/or phase equalization. In some embodiments, the polarization analyzer 1212 generates an amplitude output 1218A, a phase output 1218B, or both. The amplitude output 1218A relates to magnitudes (i.e., amplitudes) of the first and second RF signals, and the phase output 1218B relates to phases of the first and second RF signals 1232 and 1234. For example, the amplitude output 1218A is an amplitude ratio of the first and second RF signals 1232 and 1234, and the phase output 1218B is a phase difference between the first and second RF signals 1232 and 1234.

A polarization processor 1220 is coupled to the polarization analyzer 1212. The polarization processor 1220 receives the amplitude and phase outputs 1218A and 1218B, and determines the polarization of the input RF signal from which the amplitude and phase outputs 1218A and 1218B are derived. In some embodiments, the input RF signal has a linear polarization that corresponds to (a) only one field component in the amplitude output 1218A or (b) two orthogonal linear field components in the amplitude output 1218A. For linearly polarized signals received by orthogonal, linearly polarized antennas, a slant angle can be determined from the relative amplitude and phase of the signals received simultaneously by the two antennas. For circular and elliptically polarized signals received by orthogonal, linearly polarized antennas, the axial ratio, tilt angle and sense of polarization can be determined from the relative amplitude and phase of the signals received simultaneously by the two antennas.

Referring to FIG. 12A, the antenna signals 1214 and 1216 are outputted by the RF front ends of the first and second RF antenna 1202a and 1202b, and converted into two distinct optical signals, respectively. The two distinct optical signals are passed through the optical delay lines 1206 and 1206 having predetermined lengths, and demodulated to RF signals 1232 and 1234 in a manner that preserves the amplitudes and phases of the two orthogonally polarized components of the input RF signal. The first and second RF signals 1232 and 1234 outputted by the converters 1208 and 1228 are orthogonally polarized. The first and second RF signals 1232 and 1234 are alternately sampled by a switch that provides a consistent and known sampling interval to each of the first and second RF signals. The first RF signal 1232 having the first polarization (e.g., from the first RF antenna 1202a) can be shifted and synchronized with the second RF signal 1234 having the second polarization (e.g., from the second RF antenna 1202b), or vice versa. By these means, a single RF receiver (e.g., the polarization analyzer 1212) and a single processor (e.g., the polarization processor 1220) are able to analyze the simultaneous amplitudes and phases of two or more polarization components of the input RF signal.

In some embodiments, the polarimeter is configured to handle four antenna polarizations (e.g., dual linear and dual circular) and up to four delay lines, one for each polarization component of the input RF signal. In some embodiments, instead of separate optical-to-RF converters 1208 and 1228, a single optical-to-RF converter having multiple channels, like that shown in FIG. 5, is used. In some embodiments, instead of separate RF-to-optical converters 1204 and 1224, a single optical-to-RF converter having multiple channels, like that shown in FIG. 5, is used.

Referring to FIG. 12B, in some implementations, the polarimeter 1250 differs from the polarimeter 1200 in elimination of the delay path 1203B including an RF-to-optical converter 1224, and second optical delay line 1226, and the optical-to-RF converter 1228. The switch 1210 is directly coupled to the second RF antenna 1202b to receive the second antenna signal 1216. In the polarimeter 1250, only one of the antenna signals 1214 and 1216 (e.g., the first antenna signal 1214) generated by the antennas 1202a and 1202b is converted into an optical signal. The converted optical signal is passed through an optical delay line 1206 of a predetermined length and demodulated to a first RF signal 1232 in a manner that preserves the amplitude and phase of the first antenna signal 1214 derived from the input RF signal. The first RF signal 1232 (having a first polarization) from the first antenna 1202a is synchronized in post processing with the second antenna signal 1216 provided by the second antenna 1202b. The first RF signal 1232 has the first polarization, and the second antenna signal 1216 provided by the second antenna 1202b acts as a second RF signal 1234 and has a second polarization orthogonal to the first polarization.

The first RF signal 1232 and the second antenna signal 1216 are alternately selected by the switch 1210 in a time-multiplexed manner to output an RF signal 1236. The polarization analyzer 1212 is communicatively coupled to the switch 1210, and is configured to process the RF signal 1236 combining the first RF signal 1232 and the second antenna signal 1216 based on the time and/or frequency reference 1230. Specifically, the polarization analyzer 1212 temporally demultiplexes the first RF signal 1232 and second antenna signal 1216 from the RF signal 1236 based on the time and/or frequency reference 1230, counteracts the optical delay applied by the delay device 1206, and optionally applies gain and/or phase equalization. In some embodiments, the polarization analyzer 1212 generates an amplitude output 1218A and a phase output 1218B. The amplitude output 1218A relates to magnitudes (i.e., amplitudes) of the first RF signal 1232 and second antenna signal 1216, and the phase output 1218B relates to phases of the first RF signal 1232 and second antenna signal 1216. For example, the amplitude output 1218A is an amplitude ratio of the first RF signal 1232 and second antenna signal 1216, and the phase output 1218B is a phase difference between the first RF signal 1232 and second antenna signal 1216. Given that the two-channel polarimeter 1250 has a single delay path 1203A, this configuration can enhance the size, weight, power consumption, and cost of the polarimeter 1250.

Figure 12C:
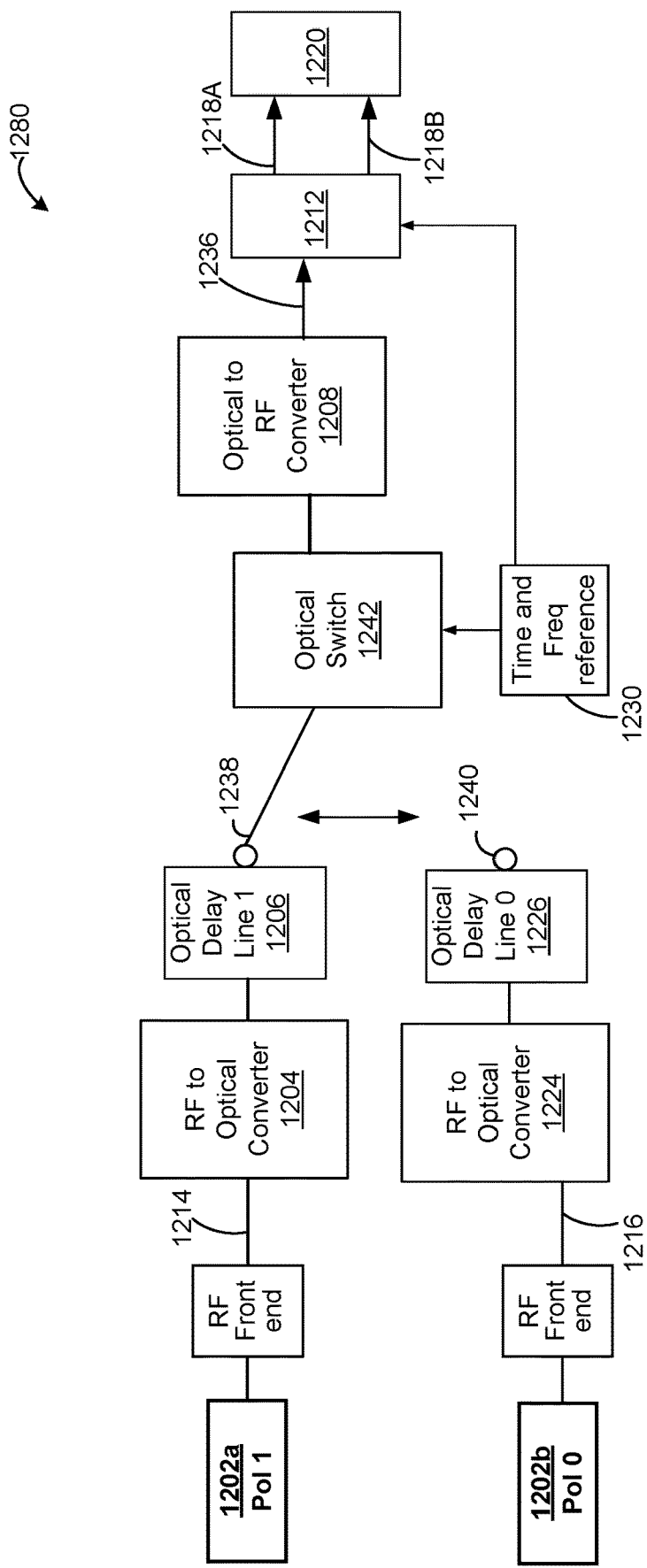
FIG. 12C is a block diagram of another two-channel polarimeter using a pair of optical delay lines and an optical switch, in accordance with some embodiments.

FIG. 12C is a block diagram of another two-channel polarimeter 1280 using a pair of optical delay lines 1206 and 1226 and an optical switch 1242, in accordance with some embodiments. Both a first RF antenna 1202a and a second RF antenna 1202b receive an input RF signal, and are configured to generate a first antenna signal 1214 and a second antenna signal 1216 jointly with corresponding RF front ends. The first and second antenna signals 1214 and 1216 are converted to two optical signals by a first RF-to-optical converter 1204 and a second RF-to-optical converter 1224, respectively. The two optical signals are delayed by the first optical delay line 1206 and second optical delay line 1226, respectively. A first delayed optical signal 1236 and a second delayed optical signal 1238 are combined by an optical switch 1242 in a time-multiplexed manner before being converted to an RF signal 1236.

A time and/or frequency reference 1230 is coupled to the optical switch 1242 and a receiver device 1212, and used as a reference to combine the optical signals 1238 and 1240 and demultiplex the RF signal 1236 to two RF signals associated with the first and second antenna signals 1214 and 1216. The receiver device 1212 includes a polarization analyzer 1212 communicatively coupled to the converter 1208 and configured to process the RF signal 1236 based on the time and/or frequency reference 1230. Specifically, the polarization analyzer 1212 temporally demultiplexes the RF signal 1236 based on the time and/or frequency reference 1230, counteracts the optical delay applied by the delay device 1206 or 1226, and/or applies gain and/or phase equalization. In some embodiments, the polarization analyzer 1212 generates an amplitude output 1218A, a phase output 1218B, or both. The amplitude output 1218A relates to magnitudes (i.e., amplitudes) of two RF signals corresponding to the two optical signals 1238 and 1240, and the phase output 1218B relates to phases of the two RF signals corresponding to the two optical signals 1238 and 1240. For example, the amplitude output 1218A is an amplitude ratio of the two RF signals corresponding to the two optical signals 1238 and 1240, and the phase output 1218B is a phase difference between the two RF signals corresponding to the two optical signals 1238 and 1240. A polarization processor 1220 is coupled to the polarization analyzer 1212. The polarization processor 1220 receives the amplitude and phase outputs 1218A and 1218B, and determines the polarization (e.g., a polarization angle, a polarization type) of the input RF signal from which the amplitude and phase outputs 1218A and 1218B are derived.

In some embodiments, the polarimeter 1200 is dedicated to polarization measurement. Alternatively, in some implementations, the polarimeter 1200 is used as both an interferometer and a polarimeter, i.e., an interferometer 104 is reconfigured to act as a single channel polarimeter-interferometer for measuring both the direction of arrival and polarization of the input RF signal. The single channel polarimeter-interferometer 104 includes more than two orthogonally polarized antennas (e.g., antennas 1402a-1402d in FIG. 14) and simple switch logic controls (e.g., switches 1406-1412 in FIG. 14), allowing the interferometer 104 to perform both polarization and angle of arrival measurements. The single channel polarimeter-interferometer 104 may utilize multiple delay paths 1203 (also called optical delay line channels 1203) with a single measurement receiver 548 (i.e., 1212). The single measurement receiver 548 (1212) is coupled to a direction finding module 550 and the processor 1220 and can be time shared to enable functionalities of direction and polarization measurement. For direction finding measurements, amplitude and phase measurements of antenna signals having the same polarization from multiple antennas 1202 are used. For polarization measurements, amplitude and phase measurements of antenna signals having two orthogonally polarized components of an input RF signal are used to determine polarization parameters (e.g., polarization angle, type, axial ratio).

For example, referring to FIG. 5, a subset of the channels 512-518 of the interferometer 104 is reconfigured to make polarization measurements, allowing direction finding and polarization measurements to be made, e.g., simultaneously and concurrently. In some implementations, the subset of the channels 512-518 is switched to measure polarization measurement for at least a duration of time, thereby enabling sequential direction finding and polarization measurements in the subset of the channels 512-518.

Figure 13A:
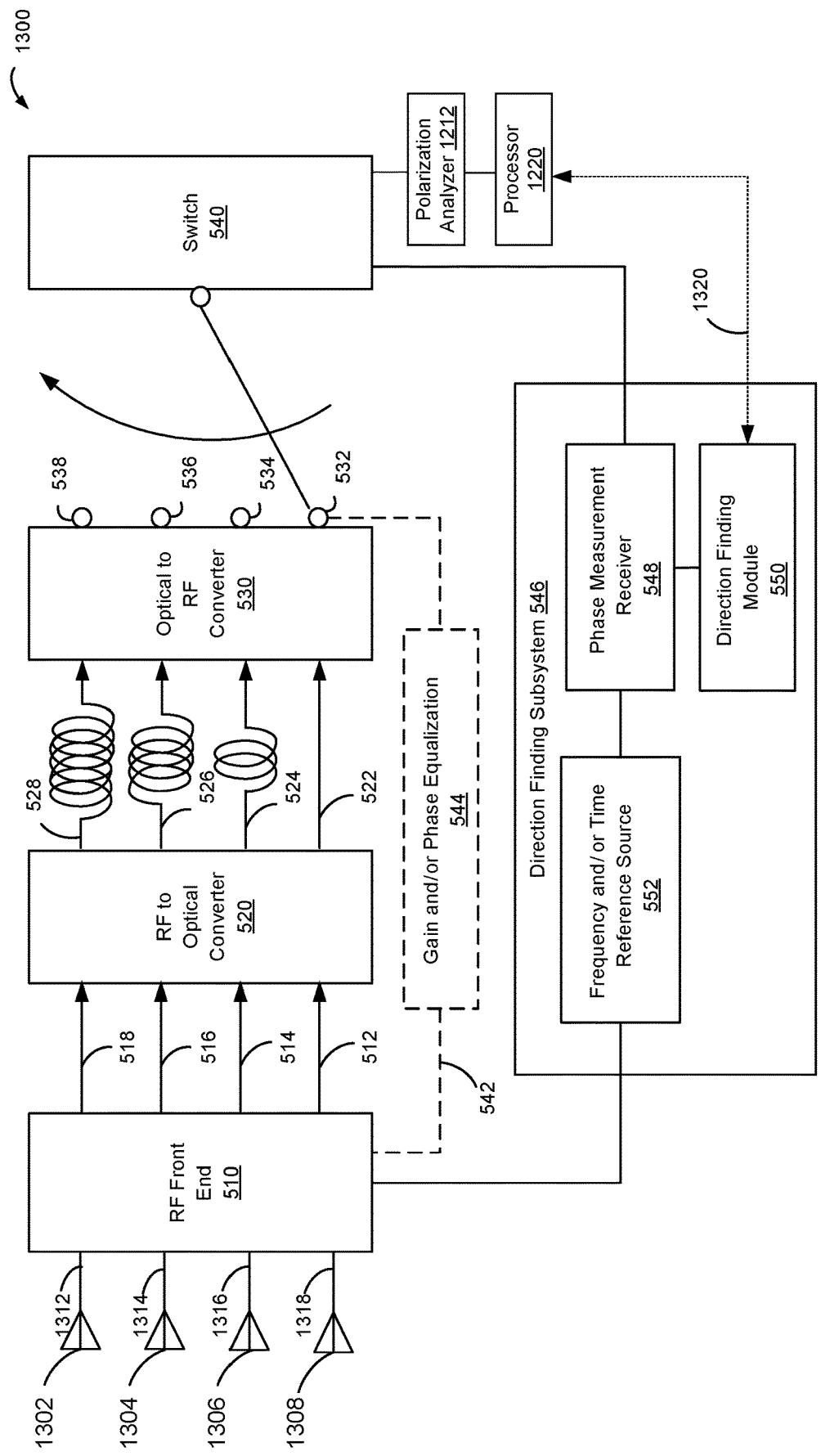
FIGS. 13A and 13B are block diagrams of interferometers, in accordance with some embodiments.
Figure 13B:
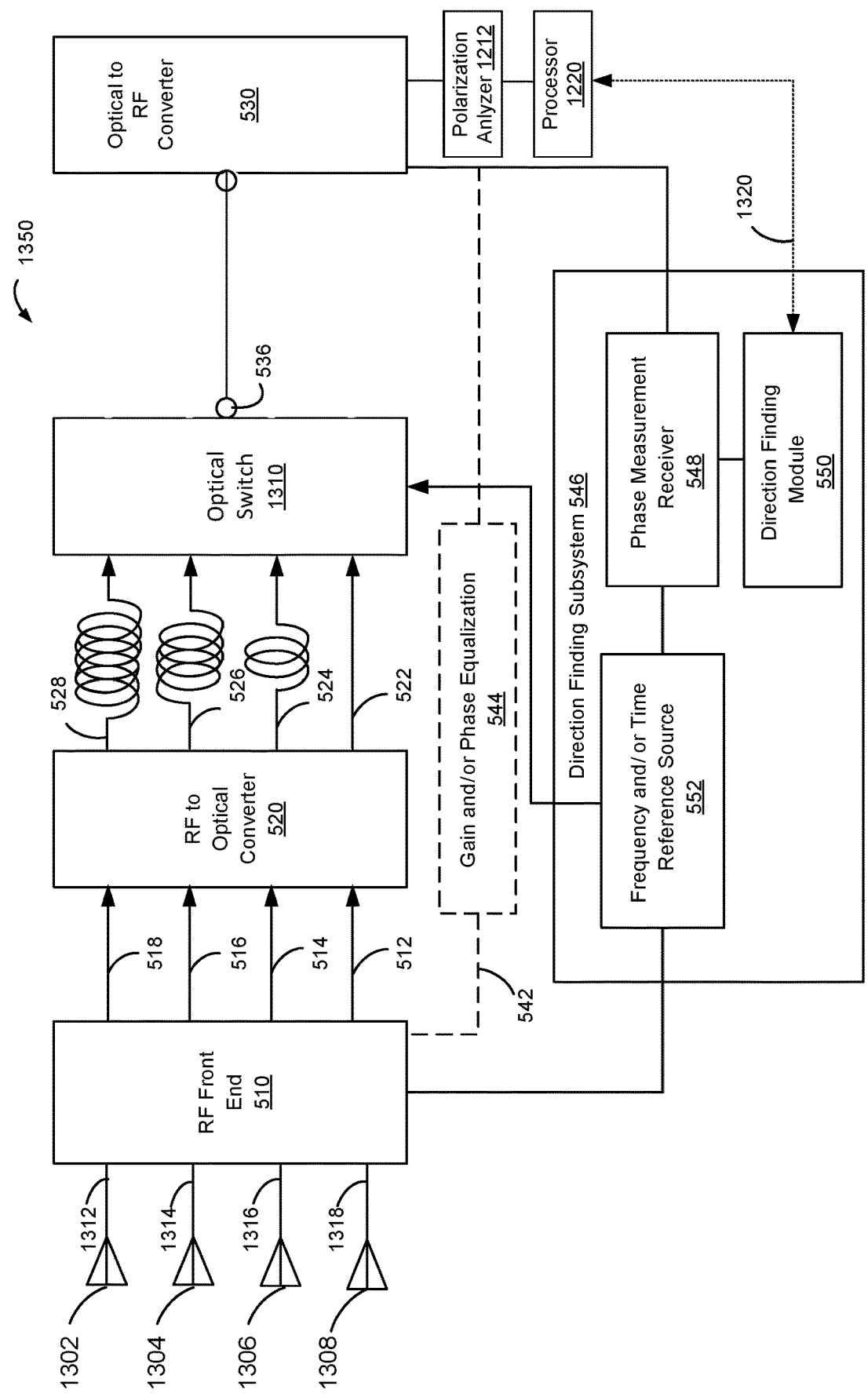

FIGS. 13A and 13B are block diagrams of interferometers 1300 and 1350, in accordance with some embodiments. Each of the antennas 1302-1308 for receiving the input RF signal and has a corresponding polarization. Each antenna 1302, 1304, 1306, or 1308 is configured to respond to a polarization component (e.g., a horizontal or vertical polarization components, a left circular or right circular polarization components) in the input RF signal to generate a respective antenna signal 1312, 1314, 1316, or 1318. The interferometer 1300 includes not only a direction finding subsystem 546 configured to measure an angle of arrival of the input RF signal, but also a polarization analyzer 1212 and processor 1220 configured to measure a polarization of the input RF signal. In some embodiments, direction and polarization measurements can complement (1320) each other, i.e., knowledge of signal polarization can improve estimation of the angle of arrival, and knowledge of the angle of arrival can improve estimation of the signal polarization.

Referring to FIG. 13A, in some embodiments, the interferometer 1300 includes an RF front end 510 for receiving respective antenna signals from each antenna 1302, 1304, 1306, or 1308. For each of the antenna 1302-1306, the input RF signal is converted by the RF front end 510 to a respective antenna signal that is further converted by a converter 520 to a respective optical signal, and the respective optical signal is delayed by an optical delay line 524, 526, or 528 and converted by a converter 530 to a respective RF signal to be outputted at an output node 532, 534, or 536. In some embodiments, for the antenna 1308, the input RF signal is also converted by the RF front end 510 to a corresponding antenna signal that is further converted by a converter 520 to a corresponding optical signal, and the respective optical signal is delayed by a distinct optical delay line 522 and converted by a converter 530 to a corresponding RF signal to be outputted at an output node 538. Alternatively, in some embodiments, for the antenna 1308, the input RF signal is also converted by the RF front end 510 to a corresponding antenna signal that is directly outputted as a corresponding RF signal. In some embodiments, a first subset of the antennas 1302-1308 (e.g., 1302 and 1304) have the same polarization and are applied to measure a direction of arrival of the input RF signal, and a second subset of the antennas 1302-1308 (e.g., 1306 and 1308) have orthogonal polarizations and are applied to measure a polarization angle or type of the input RF signal. The switch 540 (an RF electronic switch) is configured to combine the RF signals at the nodes 532-538 in a time-multiplexed manner. Each of the receiver 548 and polarization analyzer 1212 are coupled to the switch 540, and demultiplexes the combined RF signal to extract the first or second subsets of RF signals for direction or polarization finding, respectively.

Referring to FIG. 13B, in some embodiments, an optical switch 1310 is applied between the delay lines 522-528 and the converter 530, and the switch 540 is removed. The interferometer 1300 includes an RF front end 510 for receiving respective antenna signals from each antenna 1302, 1304, 1306, or 1308. For each of the antenna 1302-1306, the input RF signal is converted by the RF front end 510 to a respective antenna signal that is further converted by a converter 520 to a respective optical signal, and the respective optical signal is delayed by an optical delay line 524, 526, or 528 and outputted by the optical switch 1310 at a node 536 as a time multiplexed optical signal. The multiplexed optical signal at the node 536 is converted by the converter 530 to a multiplexed RF signal. For the antenna 1308, the input RF signal is also converted by the RF front end 510 to a corresponding antenna signal that is further converted by a converter 520 to a corresponding optical signal, and the respective optical signal is optionally delayed by a distinct optical delay line 522 or not delayed prior to being outputted into the time multiplexed optical signal at the node 536. The respective optical signal is converted by the converter 530 to be part of the combined RF signal. In some embodiments, a first subset of the antennas 1302-1308 (e.g., 1302 and 1304) have the same polarization and are applied to measure a direction of arrival of the input RF signal, and a second subset of the antennas 1302-1308 (e.g., 1306 and 1308) have orthogonal polarizations and are applied to measure a polarization angle or type of the input RF signal. The converter 530 is configured to generate the combined RF signal that integrates RF signals corresponding to the antennas 1302-1308 in a time-multiplexed manner. Each of the receiver 548 and polarization analyzer 1212 are coupled to the converter 530, and demultiplexes the combined RF signal to extract the first or second subsets of RF signals for direction or polarization finding in the direction finding module 550 and processor 1220, respectively.

In some embodiments, direction-finding measurement described with respect to FIG. 5, are conducted using a first antenna signal having a first polarization outputted from a first one of the four antennas 1302, 1304, 1306, and 1308. Optionally, the first polarization is vertical polarization. In some embodiments, direction-finding measurement described with respect to FIG. 5, are conducted using a second antenna signal having a second polarization orthogonal to the first polarization from a second one of the four antennas 1302, 1304, 1306, and 1308. Optionally, the second polarization is horizontal polarization. In some embodiments, a direction of arrival of the input signal is determined based on a phase difference corresponding to a first subset of the antennas 1302-1308, and a polarization angle of the input signal is determined based on a second subset of the antennas 1302-1308. The first subset of the antennas 1302-1308 are distinct from the second subset of the antennas 1302-1308, while optionally having an overlapping antenna used for both direction finding and polarization determination. In some embodiments, the polarization analyzer 1212 and processor 1220 are coupled to an output of the direction finding subsystem 546 and configured to determine the polarization of the input RF signal based on the direction of arrival. In some embodiments, the direction finding subsystem 546 is coupled to the polarization processor 1220 and configured to determine the direction of arrival of the input RF signal based on the polarization of the input RF signal. Since the polarization response of the receiving antennas may vary with direction of arrival, correcting the received polarization ratios based upon the measured angle of arrival can result in a more accurate polarization determination.

Further, in some embodiments, the interferometer 1300 or 1350 is coupled to a transmission antenna (not shown in FIG. 13), which enables a two-way energy transfer with the antennas 1302-1308. The transmission antenna is steerable in angle and polarization. When RF signals are transmitted by the transmission antenna, characteristics of the transmitted RF signals are determined based on a phase difference determined among the RF signals 532-538 and/or a polarization angle of the input RF signal. More details on the interferometer 1300 are discussed below with reference to FIG. 15.

Figure 14:
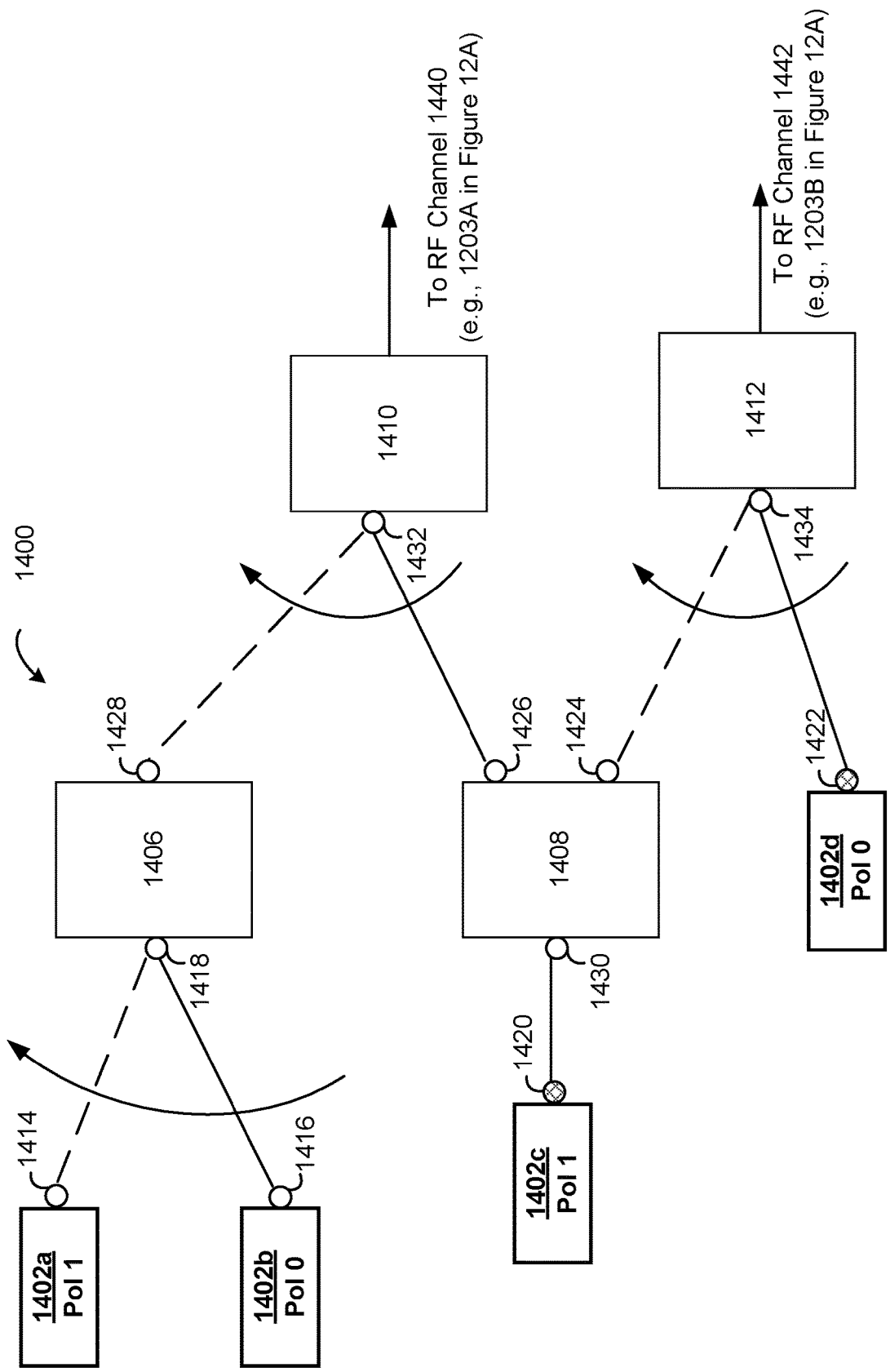
FIG. 14 is a block diagram of a switching system that permits switching between interferometry and polarimetry functions, in accordance with some embodiments.

FIG. 14 is a block diagram of a switching system 1400 that permits switching between interferometry and polarimetry functions, in accordance with some embodiments. The system 1400 includes a plurality of antennas 1402a-1402d each of which is configured to receive an input RF signal having a polarization state. A first antenna 1402a and a second antenna 1402b and corresponding RF front ends are configured to extract two orthogonal polarizations components (e.g., horizontal and vertical polarization components, left circular and right circular polarization components) in the input RF signal and output two antenna signals. A first polarization component is provided through a first node 1414 of the first antenna 1402a and a second polarization component, orthogonal to the first polarization component, is provided through a second node 1416 of the second antenna 1402b. That said, the first and second antennas 1402a and 1402b and corresponding RF front ends are configured to provide a first antenna signal and a second antenna signal via the nodes 1414 and 1416, respectively.

A third antenna 1402c and a fourth antenna 1402d and corresponding RF front ends are configured to extract the two orthogonal polarizations components (e.g., horizontal and vertical polarization components, left circular and right circular polarization components) in the input RF signal and output two antenna signals. The third antenna 1402c provides a first polarization component (i.e., a third antenna signal) through a third node 1420, and the fourth antenna 1402d provides a second polarization component (i.e., a fourth antenna signal) through a fourth node 1422.

The RF front ends further include switches 1406-1412 to select different antenna signals as inputs to RF channels 1440 and 1442, e.g., inputs to delay paths 1203A and 1203B in FIG. 12A, inputs to converters 1204 and 1224 in FIG. 12C, and inputs to channels 512-518 in FIGS. 5 and 13A-13B. A first switch 1406 having an input node 1418 is switchable between the node 1414 of the first antenna 1402a, and the node 1416 of the second antenna 1402b. The dashed lines show possible positions of each switch. A second switch 1408 having an input node 1430 is communicatively coupled to the node 1420 of the third antenna 1402c. A third switch 1410 having an input node 1432 is switchable between an output node 1428 of the first switch 1406, and an output node 1426 of the second switch 1408. A fourth switch 1412 having an input node 1434 is switchable between an output node 1424 of the second switch 1408, and an output node 1426 of the fourth antenna 1402d.

The first switch 1406 selects between two orthogonal antenna signals provided by the first and second antennas 1402a and 1402b. The second switch 1408 selects whether the third antenna signal from the third antenna 1402c is routed through the third switch 1410 or the fourth switch 1412. The third switch 1410 selects either the first or second antenna signal from a node 1428 of the first switch or the third antenna signal from a node 1426. The fourth switch 1412 selects between the third and fourth antenna signals. Stated another way, the third switch 1410 directs one of the antenna signals provided by the antennas 1402a, 1402b and 1402c to an RF channel 1440. The fourth switch 1412 directs one of the third and fourth antenna signals provided by the antennas 1402c and 1402d to an RF channel 1442.

In some embodiments, the second switch 1408 is a Single Pole Double Throw (SPDT) switch. A SPDT switch is a switch having a single input and can connect to and switch between 2 outputs. This means it has one input terminal and two output terminals.

When the fourth switch 1412 is set to the fourth antenna signal at the output node 1422, and the third switch 1410 is set to the output node 1426, the system 1400 is configured to perform polarization measurements. Alternatively, in some embodiments, when the fourth switch 1412 is set to the output node 1424, the third switch 1410 is set to the output node 1428, and the first switch 1406 is set to the node 1416, the system 1400 is configured to perform polarization measurements. In polarization measurements, signals recording by two antennas having two different polarizations (e.g., via the antennas 1402c and 1402d) are relayed to the polarization analyzer 1212 and processor 1220.

When the fourth switch is set to the output node 1422, the third switch 1410 is set to the output node 1428, and the first switch 1406 is set to the node 1416, the system 1400 is configured to perform direction finding measurements, using signals of the same polarization from two different antennas. When the fourth switch is set to the output node 1424, the third switch 1410 is set to the output node 1428, and the first switch 1406 is set to the node 1414, the system 1400 is configured to perform direction finding measurements, using signals of the same polarization from two different antennas.

FIG. 15 is a flowchart of a method 1500 implemented by an electronic system for determining a polarization state of a radio frequency (RF) signal, in accordance with some embodiments. Referring to FIGS. 12A-12C, in the electronic system, a plurality of RF antennas 1202 include a first RF antenna 1202a having a first polarization and a second RF antenna 1202b having a second polarization. The first and second polarizations are orthogonal to one another. The plurality of RF antennas 1202 receive (1502) an input RF signal having an input polarization. The first RF antenna 1202a outputs (1504) a first antenna signal 1214, and the second RF antenna outputs (1506) a second antenna signal 1216. In some embodiments, the first antenna signal 1214 has the first polarization, and the second antenna signal 1216 has the second polarization The first antenna signal is converted (1508) to a first optical signal, e.g., by a converter 1204, and the first optical signal is passed (1510) through a first optical channel (e.g., a first optical delay line 1206) to introduce a first delay. The first optical channel optionally includes an optical fiber having a first length, and the first delay is proportional to the first length of the first optical channel. The delayed optical signal is converted (1512) to a first RF signal 1232. The electronic system determines (1514) an amplitude ratio and a phase difference between the first RF signal 1232 and a second RF signal 1234 associated with the second antenna signal 1216. In some embodiments, a delay is applied by a delay device to at least one of the first and second RF signals. In some embodiments, referring to FIG. 12B, the second RF signal 1234 is the second antenna signal 1216 without having been converted to any optical signal that passes through a respective optical channel. In some embodiments, the amplitude ratio and phase difference are temporally aligned.

A polarization angle of the input RF signal received by the plurality of RF antennas 1202 is determined (1516) based on the amplitude ratio and the phase difference. In some embodiments, the electronic system determines a polarization type of the input RF signal based on the amplitude ratio and phase difference between the first and second RF signals 1232 and 1234.

In some embodiments, prior to determining an amplitude ratio and a phase difference, the electronic system converts the second antenna signal 1216 to a second optical signal in a converter 1224. The second optical signal 1216 is passed through a second optical channel (e.g., a second optical delay line 1226) to introduce a second delay. The delayed second optical signal is converted, e.g., by a converter 1228, to the second RF signal 1234 that are time aligned to determine the amplitude ratio and phase difference.

In some embodiments, an optical switch 1242 is controlled to select and output the delayed first optical signal that is further converted to the first RF signal, e.g., to first part of the RF signal 1236 by the converter 1208. After outputting the first optical signal, the optical switch 1242 is controlled to select and output the delayed second optical signal that is further converted to the second RF signal, e.g., to second part of the RF signal 1236 by the converter 1208. Further, in some embodiments, the optical switch 1210 is controlled to select and output the second RF signal after at least a predetermined amount of time after outputting the first RF signal. The first and second RF signals are time-multiplexed in the RF signal 1236 in FIG. 12C.

In some embodiments, referring to FIG. 13A, the plurality of RF antennas 1202 include a third RF antenna and a fourth RF antenna. The third RF antenna outputs a third antenna signal converted to a third optical signal, and the third signal is passed through a third optical channel to introduce a third delay. The third optical signal is converted to a third RF signal. The fourth RF antenna outputs a fourth antenna signal converted to a fourth optical signal. The fourth signal is passed through a fourth optical channel to introduce a fourth delay. The fourth optical signal is converted to a fourth RF signal. The amplitude ratio and the phase difference are determined between the third RF signal and the fourth RF signal. The polarization angle of the input RF signal is determined based on the amplitude ratio and the phase difference between the first RF signal and the second RF signal and the amplitude ratio and the phase difference between the third RF signal and the fourth RF signal. Further, in some embodiments, the plurality of RF antennas are arranged in one of a one-dimensional array, a two-dimensional or three-dimensional array. Additionally, in some embodiments, the third RF antenna includes one of the first and second antennas. For example, in FIG. 13A, the first, second, third, and fourth antennas are antennas 1302, 1304, 1302, and 1306. The antennas 1302 and 1304 are paired to provide the first and second RF signals, and the antennas 1302 and 1306 are paired to provide the third and fourth RF signals. The antenna 1302 has the first polarization, and the antennas 1304 and 1306 have the second polarization.

In some embodiments, referring to 12A, a first switch 1210 is controlled to select and output the first RF signal 1232. After outputting the first RF signal 1232, the first switch 1210 is controlled to select and output the second RF signal 1234. The first switch 1210 is controlled to select and output the second RF signal 1234 after a predetermined amount of time after outputting the first RF signal 1232 corresponding to the differential delay between the two signal paths.

In some embodiments, a memory device stores digitized representation of the first RF signal 1232 and a digitized representation of the second RF signal 1234.

In some embodiments, a digital delay device applies a delay to a reference signal generated by a reference signal generator. The phase difference between the first RF signal and the second RF signal is determined using (1) a phase difference between the first RF signal and the delayed reference signal that are synchronized and (2) a phase difference between the second RF signal and the delayed reference signal. The amplitude ratio between the first RF signal and the second RF signal is determined using (1) an amplitude ratio between the first RF signal and the delayed reference signal and (2) an amplitude ratio between the second RF signal and the delayed reference signal.

In some embodiments, referring to FIG. 13A, a direction of arrival of the input RF signal is determined based on the phase difference between the first RF signal and the second RF signal, e.g., outputted at nodes 538 and 536. Further, in some embodiments, an estimate of the direction of arrival of the input RF signal is determined based on the polarization angle of the input RF signal received by the plurality of RF antennas. Alternatively, in some embodiments, an estimate of the polarization angle of the input RF signal is determined based on the direction of arrival of the input RF signal. Additionally, in some embodiments, a two-way energy transfer is optimized by transmitting RF signals using an antenna steerable in angle and polarization, based on the phase difference determined between the first RF signal and the second RF signal, and the polarization angle of the input RF signal received by the plurality of RF antennas.

In some embodiments, referring to FIG. 13A, the plurality of RF antennas include a third RF antenna and one or more fourth antennas. The third RF antenna outputs a third antenna signal converted to a third optical signal, and each of the one or more fourth RF antennas outputs a respective fourth antenna signal. The third optical signal passes through a third optical channel to introduce a third delay and is then converted to a third RF signal. A set of phase differences are determined. Each phase difference is determined between the third RF signal and a respective fourth RF signal associated with the respective fourth antenna signal outputted by a respective fourth RF antenna. A direction of arrival of the input RF signal is determined based on at least the set of phase differences among the third and fourth RF signals.

In some embodiments, prior to determining the amplitude ratio and the phase difference between the first RF signal 1232 and the second RF signal 1234, the receiver 1212 (also called polarization analyzer 1212) synchronizes the first and second RF signals by compensating for a difference of the first delay associated with the first RF signal and a second delay associated with the second RF signal.

In some embodiments, features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 606) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 606 optionally includes one or more storage devices remotely located from the CPU(s) 602. Memory 606, or alternatively the non-volatile memory device(s) within memory 606, comprises a non-transitory computer readable storage medium.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems, and execution environments/containers.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for determining a polarization state of a radio frequency (RF) signal, the method comprising:
    receiving, by a plurality of radio frequency (RF) antennas including a first RF antenna having a first polarization and a second RF antenna having a second polarization, an input RF signal having an input polarization, wherein the first and second polarizations are orthogonal to one another;
    outputting by the first RF antenna a first antenna signal;
    outputting by the second RF antenna a second antenna signal;
    converting the first antenna signal to a first optical signal;
    passing the first optical signal through a first optical channel to introduce a first delay;
    converting the delayed first optical signal to a first RF signal;
    determining an amplitude ratio and a phase difference between the first RF signal and a second RF signal associated with the second antenna signal; and
    determining a polarization angle of the input RF signal received by the plurality of RF antennas based on the amplitude ratio and the phase difference.

2. The method of claim 1, further comprising:
    determining a polarization type of the input RF signal based on the amplitude ratio and phase difference between the first and second RF signals, wherein the amplitude ratio and phase difference are temporally aligned.

3. The method of claim 1, further comprising, prior to determining an amplitude ratio and a phase difference:
    converting the second antenna signal to a second optical signal;
    passing the second optical signal through a second optical channel to introduce a second delay; and
    converting the delayed second optical signal to the second RF signal that is used to determine the amplitude ratio and phase difference, wherein the amplitude ratio and phase difference are temporally aligned.

4. The method of claim 1, further comprising:
    controlling an optical switch to select and output the delayed first optical signal that is further converted to the first RF signal; and
    after outputting the first optical signal, controlling the optical switch to select and output the delayed second optical signal that is further converted to the second RF signal.

5. The method of claim 4, wherein the optical switch is controlled to select and output the second RF signal after at least a predetermined amount of time after outputting the first RF signal.

6. The method of claim 1, wherein the second RF signal is the second antenna signal without having been converted to any optical signal that passes through a respective optical channel.

7. The method of claim 1, wherein the first optical channel includes an optical fiber having a first length, and the first delay is proportional to the first length of the first optical channel.

8. The method of claim 1, wherein the plurality of RF antennas include a third RF antenna and a fourth RF antenna, the method further comprising:
    outputting by the third RF antenna a third antenna signal;
    converting the third antenna signal to a third optical signal;
    passing the third signal through a third optical channel to introduce a third delay;
    converting the third optical signal to a third RF signal;
    outputting by the fourth RF antenna a fourth antenna signal;
    converting the fourth antenna signal to a fourth optical signal;
    passing the fourth signal through a fourth optical channel to introduce a fourth delay;
    converting the fourth optical signal to a fourth RF signal;
    determining the amplitude ratio and the phase difference between the third RF signal and the fourth RF signal, wherein the polarization angle of the input RF signal is determined based on the amplitude ratio and the phase difference between the first RF signal and the second RF signal and the amplitude ratio and the phase difference between the third RF signal and the fourth RF signal, wherein the amplitude ratio and phase difference are temporally aligned.

9. The method of claim 8, wherein the plurality of RF antennas are arranged in one of a one-dimensional array, a two-dimensional or three-dimensional array.

10. The method of claim 1, further comprising:
    controlling a first switch to select and output the first RF signal; and
    after outputting the first RF signal, controlling the first switch to select and output the second RF signal.

11. The method of claim 10, wherein the first switch is controlled to select and output the second RF signal after a predetermined amount of time after outputting the first RF signal.

12. An electronic system, comprising:
    a plurality of radio frequency (RF) antennas configured for receiving an input RF signal having an input polarization, the plurality of RF antennas including:
        a first RF antenna having a first polarization and configured for outputting a first antenna signal; and
        a second RF antenna having a second polarization and configured for outputting a second antenna signal, the second polarization being orthogonal to the first polarization;
    a first converter configured for converting the first antenna signal to a first optical signal;
    a first optical channel configured for passing the first optical signal and introducing a first delay;
    a second converter configured for converting the first optical signal to a first RF signal; and
    a polarization unit configured for determining an amplitude ratio and a phase difference between the first RF signal and a second RF signal associated with the second antenna signal, and determining a polarization angle of the input RF signal received by the plurality of RF antennas based on the amplitude ratio and the phase difference.

13. The electronic system of claim 12, further comprising:
a memory device configured for storing a digitized representation of the first RF signal and a digitized representation of the second RF signal.

14. The electronic system of claim 12, further comprising a digital delay device configured for applying a delay to a reference signal generated by a reference signal generator;
wherein the amplitude ratio and phase difference are temporally aligned;
wherein the phase difference between the first RF signal and the second RF signal is determined using:
a phase difference between the first RF signal and the delayed reference signal that are synchronized, and
a phase difference between the second RF signal and the delayed reference signal; and
wherein the amplitude ratio between the first RF signal and the second RF signal is determined using:
an amplitude ratio between the first RF signal and the delayed reference signal, and
an amplitude ratio between the second RF signal and the delayed reference signal.

15. The electronic system of claim 12, wherein the polarization unit is configured for determining a direction of arrival of the input RF signal based on the phase difference between the first RF signal and the second RF signal.

16. The electronic system of claim 15, wherein the electronic system is configured for improving an estimate of the direction of arrival of the input RF signal based on the polarization angle of the input RF signal received by the plurality of RF antennas.

17. The electronic system of claim 15, wherein the polarization unit is configured for improving an estimate of the polarization angle of the input RF signal based on the direction of arrival of the input RF signal.

18. The electronic system of claim 15, wherein the electronic system is configured for optimizing a two-way energy transfer by transmitting RF signals using an antenna steerable in angle and polarization, based on the phase difference determined between the first RF signal and the second RF signal, and the polarization angle of the input RF signal received by the plurality of RF antennas.

19. The electronic system of claim 12, wherein the plurality of RF antennas includes a third RF antenna and one or more fourth antennas, and the electronic system is configured for:
outputting by the third RF antenna a third antenna signal;
outputting by each of the one or more fourth RF antennas a respective fourth antenna signal;
converting the third antenna signal to a third optical signal;
passing the third optical signal through a third optical channel to introduce a third delay;
converting the third optical signal to a third RF signal;
determining a set of phase differences, including determining each phase difference between the third RF signal and a fourth RF signal associated with a respective fourth antenna signal outputted by a respective fourth RF antenna, wherein the set of phase differences are temporally aligned; and
determining a direction of arrival of the input RF signal based on at least the set of phase differences among the third and fourth RF signals.

20. The electronic system of claim 19, wherein the polarization unit is configured for, prior to determining the amplitude ratio and the phase difference between the first RF signal and the second RF signal, synchronizing the first and second RF signals by compensating for a difference of the first delay associated with the first RF signal and a second delay associated with the second RF signal.

* * * * *